United States Patent
Deguchi et al.

(10) Patent No.: US 8,650,576 B2
(45) Date of Patent: Feb. 11, 2014

(54) STORAGE APPARATUS AND STORAGE APPARATUS MANAGEMENT METHOD

(75) Inventors: Akira Deguchi, Yokohama (JP); Shintaro Kudo, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 279 days.

(21) Appl. No.: 13/140,300

(22) PCT Filed: Jun. 3, 2011

(86) PCT No.: PCT/JP2011/003164
§ 371 (c)(1),
(2), (4) Date: Jun. 16, 2011

(87) PCT Pub. No.: WO2012/164633
PCT Pub. Date: Dec. 6, 2012

(65) Prior Publication Data
US 2012/0311602 A1    Dec. 6, 2012

(51) Int. Cl.
*G06F 9/46* (2006.01)

(52) U.S. Cl.
USPC .......................................................... 718/105

(58) Field of Classification Search
USPC .......................................................... 718/105
See application file for complete search history.

(56) References Cited

U.S. PATENT DOCUMENTS

| | | | | |
|---|---|---|---|---|
| 8,146,092 | B2 * | 3/2012 | Ogawa et al. | 718/105 |
| 8,275,937 | B2 * | 9/2012 | Serizawa et al. | 711/114 |
| 2003/0135621 | A1 * | 7/2003 | Romagnoli | 709/226 |
| 2008/0263190 | A1 | 10/2008 | Serizawa et al. | |

FOREIGN PATENT DOCUMENTS

| | | |
|---|---|---|
| JP | 2008-269424 A | 11/2008 |
| WO | 2010/041481 A1 | 4/2010 |
| WO | 2010/137070 A1 | 12/2010 |
| WO | 2010/137071 A1 | 12/2010 |

* cited by examiner

*Primary Examiner* — Emerson Puente
*Assistant Examiner* — Steven Do
(74) *Attorney, Agent, or Firm* — Volpe and Koenig, P.C.

(57) ABSTRACT

The overall processing function of a storage apparatus is improved by suitably migrating ownership.

The storage apparatus comprises a plurality of microprocessors; a plurality of storage areas formed in a drive group configured from a plurality of physical drives; and a management unit which manages, as the microprocessors which possess ownership to the storage areas, the microprocessors which handle data I/Os to/from one or more storage areas among the plurality of storage areas, wherein the management unit detects variations in the processing loads of the plurality of microprocessors, selects a migration-source microprocessor which migrates the ownership and a migration-destination microprocessor which is the ownership migration destination on the basis of variations in the processing load, and determines whether to migrate the ownership on the basis of information on a usage status of resources of each of the storage areas to which the migration-source microprocessor possesses ownership.

12 Claims, 33 Drawing Sheets

FIG.3

| VOLUME NUMBER | DISTRIBUTION DESTINATION MPPK NUMBER |
|---|---|
| 0 | 0 |
| 1 | 0 |
| 2 | 0 |
| 3 | 1 |
| 4 | 2 |
| 5 | 1 |
| 6 | 0 |
| 7 | 3 |
| ⋮ | ⋮ |

| TYPE | IDENTIFICATION NUMBER | OWNER MPPK NUMBER |
|---|---|---|
| VOLUME | 0 | 0 |
| | 1 | 0 |
| | 2 | 0 |
| | 3 | 1 |
| | 4 | 2 |
| | 5 | 1 |
| | 6 | 0 |
| | 7 | 3 |
| | ⋮ | ⋮ |
| REMOTE-COPY GROUP | 1 | 1 |
| | 2 | 1 |
| | 3 | 1 |
| | 4 | 3 |
| | 5 | 2 |
| | ⋮ | ⋮ |
| ⋮ | ⋮ | ⋮ |

| TYPE | IDENTIFICATION NUMBER | MP UTILIZATION |
|---|---|---|
| MPPK | 0 | 80% |
| | 1 | 45% |
| | 2 | 30% |
| | 3 | 20% |
| | ⋮ | ⋮ |
| VOLUME | 0 | 2% |
| | 1 | 8% |
| | 2 | 2% |
| | 3 | 1% |
| | 4 | 0% |
| | 5 | 3% |
| | 6 | 2% |
| | 7 | 5% |
| | ⋮ | ⋮ |

| TYPE | IDENTIFICATION NUMBER | MIGRATION FLAG |
|---|---|---|
| MPPK | 0 | ON |
| | 1 | ON |
| | 2 | OFF |
| | 3 | ON |
| | ⋮ | ⋮ |
| VOLUME | 0 | ON |
| | 1 | ON |
| | 2 | ON |
| | 3 | ON |
| | 4 | OFF |
| | ⋮ | ⋮ |
| REMOTE-COPY GROUP | 0 | OFF |
| | 1 | OFF |
| | 2 | OFF |
| | 3 | ON |
| | ⋮ | ⋮ |

MIGRATION OBJECT CONFIGURATION MODIFICATION SCREEN (MPPK UNITS) ~300

- ☑ MPPK0 ~310
- ☐ MPPK1
- ☐ MPPK2
- ☐ MPPK3

☑ NON-MIGRATION OBJECT ~320
☐ MIGRATION OBJECT ~330

[APPLY CONFIGURATION] ~340

MIGRATION OBJECT CONFIGURATION SCREEN (VOLUME UNITS) ~350

☑ NON-MIGRATION OBJECT ~320
☐ MIGRATION OBJECT ~330

Grid with columns 0–f and rows 0–f, with a checkmark at row 3, column 5. ~360

[APPLY CONFIGURATION] ~340

FIG. 11

| TYPE | IDENTIFICATION NUMBER | RESPONSE TIME |
|---|---|---|
| VOLUME | 0 | 1 MILLISECOND |
| | 1 | 2 MILLISECONDS |
| | 2 | 3 MILLISECONDS |
| | 3 | 10 MILLISECONDS |
| | ⋮ | ⋮ |
| MPPK | 0 | 1 MILLISECOND |
| | 1 | 2 MILLISECONDS |
| | 2 | 20 MILLISECONDS |
| | 3 | 4 MILLISECONDS |
| | ⋮ | ⋮ |

| MPPK NUMBER | CAPACITY | CACHE USAGE RATE | CLEAN RATIO | DIRTY RATIO | |
|---|---|---|---|---|---|
| 0 | 256GB | 100% | 30% | 70% | |
| 1 | 256GB | 60% | 50% | 10% | |
| 2 | 256GB | 20% | 15% | 5% | |
| 3 | 256GB | 100% | 100% | 0% | 2215 |
| 2215a | 2215b | 2215c | 2215d | 2215e | |

FIG. 15

| VOLUME NUMBER | CACHE USAGE RATE | CLEAN RATIO | DIRTY RATIO |
|---|---|---|---|
| 0 | 5% | 5% | 0% |
| 1 | 10% | 4% | 6% |
| 2 | 2% | 1% | 1% |
| 3 | 10% | 10% | 0% |
| 4 | 10% | 10% | 0% |
| 5 | 5% | 0% | 5% |
| 6 | 2% | 2% | 0% |
| 7 | 0% | 0% | 0% |
| ⋮ | ⋮ | ⋮ | ⋮ |

| TYPE | IDENTIFICATION NUMBER | LOCAL MEMORY | DATA TRANSFER BUFFER | I/O MULTIPLICITY | COPY JOB MULTIPLICITY |
|---|---|---|---|---|---|
| MPPK | 0 | 100% | 80% | 50% | 50% |
| | 1 | 20% | 60% | 60% | 50% |
| | 2 | 10% | 50% | 50% | 0% |
| | 3 | 60% | 20% | 10% | 100% |
| | ... | ... | ... | ... | ... |
| VOLUME | 0 | 10% | 2% | 20% | 5% |
| | 1 | 2% | 6% | 5% | 0% |
| | 2 | 2% | 8% | 7% | 0% |
| | 3 | 8% | 5% | 1% | 5% |
| | ... | ... | ... | ... | ... |

| MPPK NUMBER | RESOURCE TYPE | RESERVATION FAILURE COUNT |
|---|---|---|
| 0 | CACHE | 200 |
| | LOCAL MEMORY | 50 |
| | DATA TRANSFER BUFFER | 100 |
| | I/O MULTIPLICITY | 80 |
| | JOB MULTIPLICITY | 0 |
| 1 | CACHE | 0 |
| | LOCAL MEMORY | 0 |
| | DATA TRANSFER BUFFER | 5 |
| | I/O MULTIPLICITY | 5 |
| | JOB MULTIPLICITY | 100 |
| ⋮ | ⋮ | ⋮ |

| PROGRAM UNIT | ~222 |
| --- | --- |
| CONFIGURATION MODIFICATION PROGRAM | ~2221 |
| FIRST MONITORING PROGRAM | ~2222 |
| OWNER RIGHTS MIGRATION PROGRAM | ~2223 |
| MPPK MONITORING PROGRAM | ~2224 |
| RESOURCE MONITORING PROGRAM | ~2225 |
| VOLUME MONITORING PROGRAM | ~2226 |
| REMOTE-COPY GROUP MONITORING PROGRAM | ~2227 |
| SECOND MONITORING PROGRAM | ~2228 |
| MP UTILIZATION EQUALIZATION PROGRAM | ~2229 |
| RESOURCE DEPLETION ELIMINATION PROGRAM | ~2230 |
| RESPONSE TIME IMPROVEMENT PROGRAM | ~2231 |

FIG. 29

| VOLUME NUMBER | I/O COUNT |
|---|---|
| 0 | 100 |
| 1 | 200 |
| 2 | 300 |
| 3 | 50 |
| ⋮ | ⋮ |

2240a  2240b

2240

F I G. 30

| MPPK NUMBER | PARTITION NUMBER |
|---|---|
| 0 | 0 |
| 1 | 0 |
| 2 | 1 |
| 3 | 1 |
| ⋮ | ⋮ |

2241

2241a  2241b

STORAGE APPARATUS AND STORAGE APPARATUS MANAGEMENT METHOD

TECHNICAL FIELD

The present invention relates to a storage apparatus and a load distribution method and is suitably applied to a storage apparatus and a storage apparatus management method which perform data I/O processing using a plurality of microprocessors.

BACKGROUND ART

In recent years, in order to handle various large-volume data in various government, corporate and university institutions and other types of institutions, data has been managed using comparatively large-scale storage apparatuses. A large-scale storage apparatus of this kind is configured having a plurality of storage devices (hard disk drives and so on, for example) arranged in an array. For example, one RAID (Redundant Arrays of Independent Disks) group is configured from one or more hard disk drives, and one or more logical volumes are defined in a physical storage area provided by one RAID group. Furthermore, the logical volumes are provided to the host apparatus. The host apparatus is able to perform data writing and reading by transmitting predetermined commands to logical volumes.

In the foregoing storage apparatus, higher performance is required in order to process various large-volume data. Hence, in order to increase the performance of the storage apparatus, PTL1 discloses a technology according to which microprocessor packages (hereinafter called MPPK) which handle data processing to write and read data to/from logical volumes are determined beforehand and control information required for data processing is stored in the local memory in the MPPK. Here, an MPPK which handles the processing of a certain logical volume is called an owner MPPK and this MPPK is described hereinbelow as if it had ownership to the logical volume.

Furthermore, PTL1 discloses the fact that, if the data processing load varies from MPPK to MPPK, the MPPK processing load is distributed by changing the ownership of a certain logical volume to another MPPK. In addition, PTL2 discloses the fact that ownership is changed while I/O requests from the host apparatus are received. Accordingly ownership can be migrated without stopping task processing which is executed by the host apparatus.

CITATION LIST

Patent Literature

PTL 1: Japanese Published Unexamined Patent Application No. 2008-269424
PTL 2: International Publication No. 2010/137071

SUMMARY OF INVENTION

Technical Problem

However, according to the foregoing PTL1, MPPK ownership is migrated only by considering MPPK microprocessor utilization (hereinafter microprocessor utilization is described as MP utilization) and therefore the processing load of the source MPPK having ownership is distributed in order to improve the performance of the MPPK; however, the performance of the whole storage apparatus is desirably further improved by also considering the response performance of the destination MPPK having ownership to the logical volumes and the throughput performance of the destination MPPK.

The present invention was devised in view of the foregoing points and proposes a storage apparatus and storage apparatus management method with which the processing performance of the whole storage apparatus can be improved by suitably migrating ownership.

Solution to Problem

In order to achieve the foregoing object, the present invention provides a storage apparatus which is connected via a network to a host apparatus which requests data I/Os, the storage apparatus comprising a plurality of microprocessors; a plurality of storage areas formed in a drive group configured from a plurality of physical drives; and a management unit which manages, as the microprocessors which possess ownership to the storage areas, the microprocessors which handle data I/Os to/from one or more storage areas among the plurality of storage areas, wherein the management unit detects variations in the processing loads of the plurality of microprocessors, selects a migration-source microprocessor which migrates the ownership and a migration-destination microprocessor which is the ownership migration destination on the basis of variations in the processing load, and determines whether to migrate the ownership on the basis of information on a usage status of resources of each of the storage areas to which the migration-source microprocessor possesses ownership.

According to this configuration, the management unit detects variations in the processing loads of the plurality of microprocessors provided to the storage apparatus and selects a migration-source microprocessor which migrates the ownership and a migration-destination microprocessor which is the ownership migration destination on the basis of variations in the processing. The management unit further determines whether to migrate the microprocessor ownership on the basis of the usage status and the like of resources of the volumes to which the migration-source microprocessor possesses ownership, and determines whether to migrate ownership to the microprocessor on the basis of information on the state of I/O processing and the like of the migration-destination microprocessor. Accordingly, reduced performance caused by ownership migration can be avoided and resource depletion caused by ownership migration can be eliminated, thus improving the usage efficiency of the MPPK.

Advantageous Effects of Invention

The present invention enables the processing performance of the whole storage apparatus to be improved by suitably migrating ownership.

BRIEF DESCRIPTION OF DRAWINGS

FIG. 3 is a diagram showing content of a distribution destination MPPK table according to this embodiment.
FIG. 4 is a diagram showing content of an owner MPPK table according to this embodiment.
FIG. 5 is a diagram showing content of an MP utilization table according to this embodiment.

FIG. 6 is a diagram showing content of a migration object table according to this embodiment.

FIG. 7 is a conceptual view of a migration object configuration modification screen according to this embodiment.

FIG. 11 is a diagram showing content of a response time table according to this embodiment.

FIG. 14 is a diagram showing content of an MPPK cache management table according to this embodiment.

FIG. 15 is a diagram showing content of a volume cache management table according to this embodiment.

FIG. 16 is a diagram showing content of a resource management table according to this embodiment.

FIG. 18 is a diagram showing content of a resource depletion table according to this embodiment.

FIG. 24 is a block diagram showing control information of a storage apparatus according to a second embodiment.

FIG. 29 is a diagram showing content of an I/O count table according to this embodiment.

FIG. 30 is a diagram showing content of a partition table according to a third embodiment.

DESCRIPTION OF PREFERRED EMBODIMENTS

Figure 1:
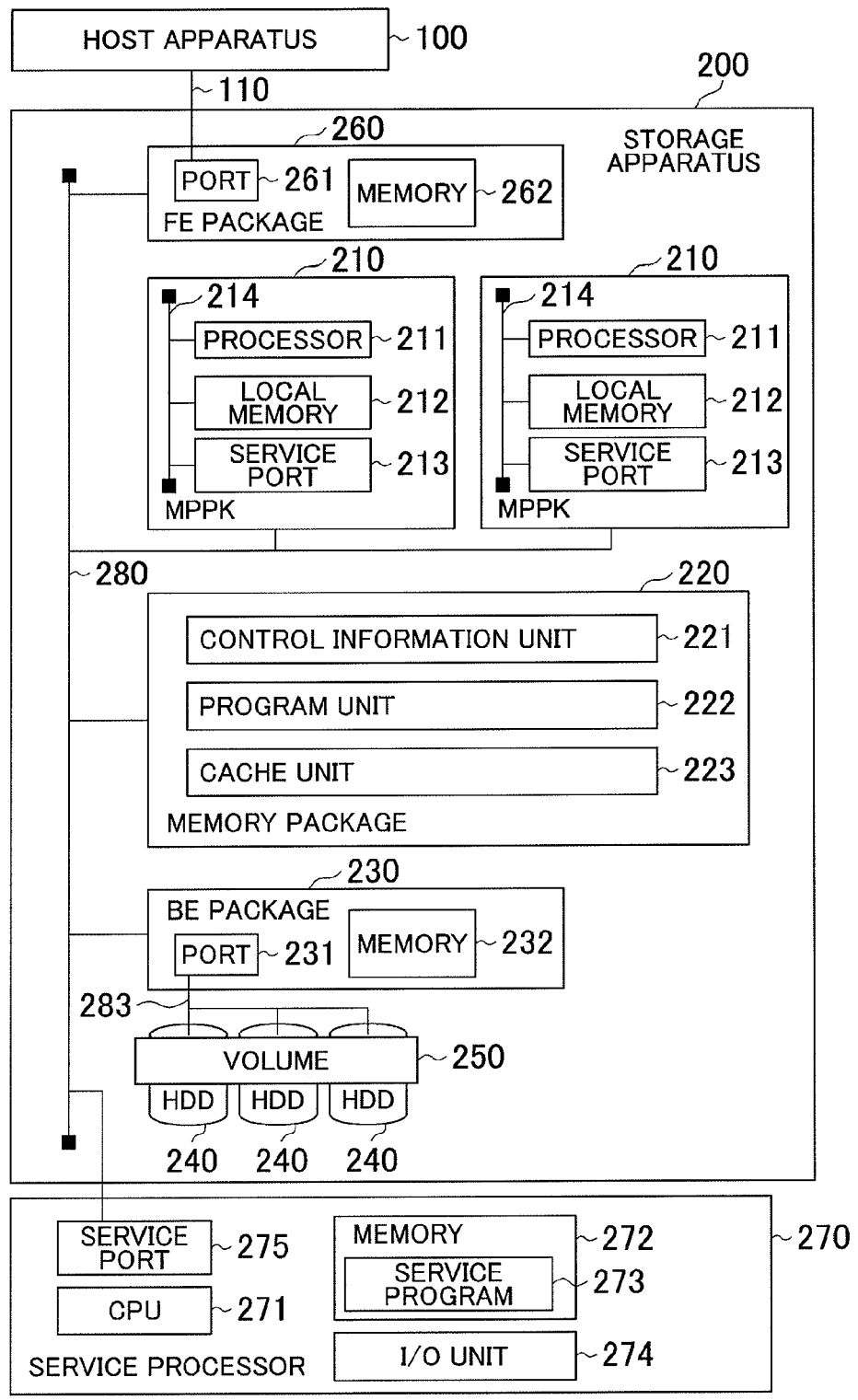
FIG. 1 shows the overall configuration of a computer system according to a first embodiment of the present invention.

Embodiments of the present invention will be described in detail hereinbelow with reference to the drawings.

(1) First Embodiment (1-1) Overview of the Embodiment

An overview of the embodiment will first be provided. In recent years, in order to handle various large-volume data in various government, corporate and university institutions and other types of institutions, data has been managed using comparatively large-scale storage apparatuses. A large-scale storage apparatus of this kind is configured having a plurality of storage devices (hard disk drives and so on, for example) arranged in an array. For example, one RAID (Redundant Arrays of Independent Disks) group is configured from one or more hard disk drives, and one or more logical volumes are defined in a physical storage area provided by one RAID group. Furthermore, the logical volumes are provided to the host apparatus. The host apparatus is able to perform data writing and reading to/from the logical volumes by transmitting predetermined commands thereto.

In the foregoing storage apparatus, higher performance is required in order to process various large-volume data. Hence, in order to increase the performance of the storage apparatus, PTL1 discloses a technology according to which microprocessor packages (hereinafter sometimes also described as MPPK) which handle data processing to write and read data to/from logical volumes are determined beforehand and control information required for data processing is stored in the local memory in the MPPK. Here, an MPPK which handles the processing of a certain logical volume is called an owner MPPK and this MPPK is described hereinbelow as if it had ownership to the logical volume.

Conventionally, if the data processing varies slightly from MPPK to MPPK, the MPPK processing load is distributed by changing the ownership of a certain logical volume to another MPPK. However, the following problems arise if the MP utilization of the MPPK alone is considered to detect a processing load variation, determine the source MPPK and destination MPPK, or determine the ownership being migrated.

(a-1) Impaired Response Performance Due to Ownership Migration

In a storage apparatus, various processes such as read processing, write processing, copy processing, and fault handling processing are executed, but the times during which the MPPK processor is continuously occupied by each process differ. The greater the time a microprocessor is continuously occupied, the longer the wait time until the microprocessor in the MPPK is unused. Hence, even when the MP utilization of each of the MPPK is identical, differences in the response performance may arise. Therefore, if ownership is migrated only by considering the MP utilization of the MPPK, the I/O response performance to the volume may be impaired still further as a result of migrating the ownership. In addition, if MPPK which exhibit substantially identical MP utilization are migration-destination candidates, an MPPK with a poor response time may be selected and ownership may be migrated to this MPPK.

(a-2) Migration-Destination MPPK Resource Depletion Due to Ownership Migration

There are resources which are provided to MPPK units in the storage apparatus. For example, the resources which are provided to MPPK units may include the capacity of the local memory in the MPPK and the cache and data transfer buffer areas, as well as job multiplicity and so on. If the MPPK which is the ownership migration destination is determined without considering the usage status of these MPPK resources, resource depletion may arise in the migration-destination MPPK after ownership migration and there may be a drop in the overall performance of the storage apparatus.

(a-3) Ownership Migration for Resolving Response Performance Variation and Resource Depletion As mentioned earlier, various processing is executed in the storage apparatus and the response times required by each processing are different. There is a particular need for a high response performance to an I/O request from the host apparatus, and variations in response performance can be resolved by migrating volume ownership. Furthermore, MPPK are provided with the resources mentioned in (a-2) above. When there is a performance bottleneck due to the depletion of resources other than the microprocessor in the MPPK, there is no increase in the MP utilization of the MPPK. In this state, even when ownership is migrated from an MPPK with a high MP utilization to an MPPK for which there is no increase in MP utilization due to resource depletion, processing of migrated volumes for which resources are depleted is not carried out and there is a drop in the performance of the overall storage apparatus.

Hence, according to this embodiment, ownership is migrated by considering the usage status of resources in the storage apparatus, the response time, and the MP utilization and the like, and a specific volume and specific MPPK are configured so as to be excluded from the ownership migration object. A drop in performance due to ownership migration can accordingly be avoided and MPPK utilization efficiency can be improved by resolving resource depletion caused by the migration of ownership.

(1-2) Hardware Configuration of Computer System

The hardware configuration of a computer system 1 will be described next. As shown in FIG. 1, the computer system 1 is configured from a host apparatus 100, a storage apparatus 200, and a service processor 270.

The host apparatus 100 is a computer device which comprises information processing resources such as a CPU (Central Processing Unit) and a memory and is configured, for example, from a personal computer, a workstation, or a mainframe. The CPU functions as an arithmetic processing device and controls the operation of the host apparatus 100 according to programs and arithmetic parameters and the like which are stored in the memory. Furthermore, the host apparatus 100 comprises information input devices such as a keyboard, a switch, a pointing device and a microphone, and information output devices such as a monitor display and a speaker.

Furthermore, the host apparatus 100 is connected to the storage apparatus 200 via a network 110. The network 110 is configured, for example, from a SAN (Storage Area Network) or the like and inter-device communications are carried out according to the Fibre Channel Protocol, for example. Further, the network 110 may be a LAN (Local Area Network), the Internet, a public line, or a dedicated line, or the like, for example. If the network is a LAN, inter-device communications are executed according to the TCP/IP (Transmission Control Protocol/Internet Protocol) protocol, for example.

Furthermore, the host apparatus 100 is a device for performing predetermined task processing by executing software of a database management system or the like. Part or all of the data used in the task processing which is executed by the host apparatus 100 is stored in the storage apparatus 200. In order to refer to and update the data stored in the storage apparatus 200, the host apparatus 100 transmits a read request or write request to the storage apparatus 200 via the network 110.

The service processor 270 is a computer device comprising a CPU 271, a memory 272, an I/O unit 274, and a service port 275 and is configured, for example, from a personal computer, a workstation, or a mainframe, or the like. Further, the service processor 270 is connected to MPPK 210 of the storage apparatus 200 via a network 280 of the storage apparatus 200.

In addition, the CPU 271 functions as an arithmetic processing device and controls the operation of the service processor 270 according to programs and arithmetic parameters and the like stored in the memory 272. More specifically, the CPU 271 implements servicing of the MPPK 210 by reading the service program 273 stored in the memory 272 and executing the service program 273.

The service port 275 is connected to the service ports 213 of the MPPK 210, acquires operation information from the MPPK 210, and transmits commands and the like for executing service operations on the MPPK 210. The operation information and the like acquired from the MPPK 210 is stored in the memory 272.

The I/O unit 274 is configured from information input devices such as a keyboard, switch, pointing device, and microphone and from information output devices such as a monitor display and speaker, and receives input operations of the operator and displays operation information of the storage apparatus 200 on a display device. Note that the service processor 270 comprises a power source (not shown).

Furthermore, the storage apparatus 200 is configured from a frontend package (appears in the drawings as FE package) 260, an MPPK (denoted MPPK in the drawings) 210, a memory package 220, a backend package (denoted BE package in the drawings) 230 and a hard disk drive (denoted HDD (Hard Disk Drive) in the drawings) 240. In addition, these internal devices are mutually connected via the network 280. Note that the storage apparatus 200 may also be provided with a plurality of the frontend package 260, the MPPK 210, the memory package 220, the backend package 230, and the hard disk drive 240, respectively.

The frontend package 260 comprises a port 261 and a memory 262. The port 261 is connected to a port (not shown) of the host apparatus 100 and receives write requests and read requests from the host apparatus 100 via the port of the host apparatus 100. Note that the port of the host apparatus 100 and the port 261 may be directly connected or may be connected indirectly using a switch or the like. In addition, the memory 262 temporarily stores information of the MPPK 210 (owner MPPK) which processes read requests or write requests which are received from the host apparatus 100 as well as data which is transferred from the host apparatus 100 and data transferred to the host apparatus 100. Note that the frontend package 260 may also comprise one or more of the port 261 and the memory 262.

The MPPK 210 comprises a processor 211, a local memory 212 and a service port 213. The internal devices thereof are also mutually connected via the network 214. Note that one MPPK 210 may also comprise a plurality of the processor 211, the local memory 212 and the service port 213.

By reading and executing the programs stored in the program unit 222 in the memory package 220, the processor 211 executes write processing and read processing from the host apparatus 100. In addition to storing temporary data of programs used by the processor 211, the local memory 212 stores various data such as control information, task data, and programs which are stored in the hard disk drive 240 and memory package 220. Note that the distance of the local memory 212 from the processor 211 is shorter than that of the memory package 220 or hard disk drive 240 and hence there is high-speed access to the local memory 212 from the processor 211.

The service port 213 is connected to the service port 275 of the service processor 270 via the network 280 and comprises a function for transmitting operation information of the MPPK 210 to the service processor 270 and for receiving service operations from the service processor 270.

The memory package 220 comprises a control information unit 221, a program unit 222, and a cache unit 223 and the like. The program unit 222 stores programs for implementing processing which is executed by the storage apparatus 200. Furthermore, the control information unit 221 stores control information which is used by the programs stored in the program unit 222. The programs stored in the memory package 220 and control information used by the programs are read from the memory package 220 by the processor 211 of the MPPK 210 which executes processing.

The cache unit 223 temporarily stores data which is stored in the hard disk drive 240. The memory package 220 is a higher-speed storage medium than the hard disk drive 240. Hence, by storing data and the like having a high usage frequency in the cache unit 223, among the data stored in the hard disk drive 240, processing of a read request or write request from the host apparatus 100 can be executed more rapidly than if all the data is always stored in the hard disk drive 240. Note that the memory package 220 may be duplicated in order to avoid data loss or similar when a fault arises.

The backend package 230 comprises a port 231 and a memory 323. The port 231 is connected to the hard disk drive 240 via a network 283 and writes write data from the host apparatus 100 to the hard disk drive 240 and reads data from the hard disk drive 240 according to a read request from the host apparatus 100. The memory 232 temporarily stores the data which is transferred to the hard disk drive 240 and the data which is read from the hard disk drive 240. Note that the backend package 230 may comprise one or more of the port 231 and the memory 232.

The hard disk drive 240 is a storage medium for storing various data which is used by software that is run by the host apparatus 100. The hard disk drive 240 may be configured from a plurality of hard disk drives (HDD) formed of high-cost hard disk drives such as SCSI (Small Computer System Interface) disks or low-cost hard disk drives such as SATA (Serial AT Attachment) disks. Furthermore, storage media other than hard disk drives may be flash memory, SSDs (Solid State Drives) or DVDs, for example.

In addition, one or more hard disk drives 240 may be gathered in units known as parity groups to form highly reliable groups known as RAID (Redundant Arrays of Independent Disks). Furthermore, a parity group which is configured from one or more hard disk drives 240 may be divided into one or more logical areas and these areas may each be handled as logical storage devices. These logical storage devices are the foregoing logical volumes and will be described hereinbelow simply as the volumes 250.

(1-3) Configuration of Storage Apparatus Functions

In the storage apparatus 200 according to this embodiment, an owner MPPK 210 which handles processing for each volume 250 is determined beforehand. By thus deciding upon an owner MPPK 210 for each volume 250, it is possible to restrict the MPPK 210 which are able to access the control information required for the processing of the volumes 250 to one MPPK 210. Hence, the control information required for this processing can be stored in the local memory 212 of the MPPK 210, thus making it possible to expedite the processing of the volumes 250. The various control information of the storage apparatus 200 for which ownership to the volumes 250 are configured will be described in detail hereinbelow.

Figure 2:
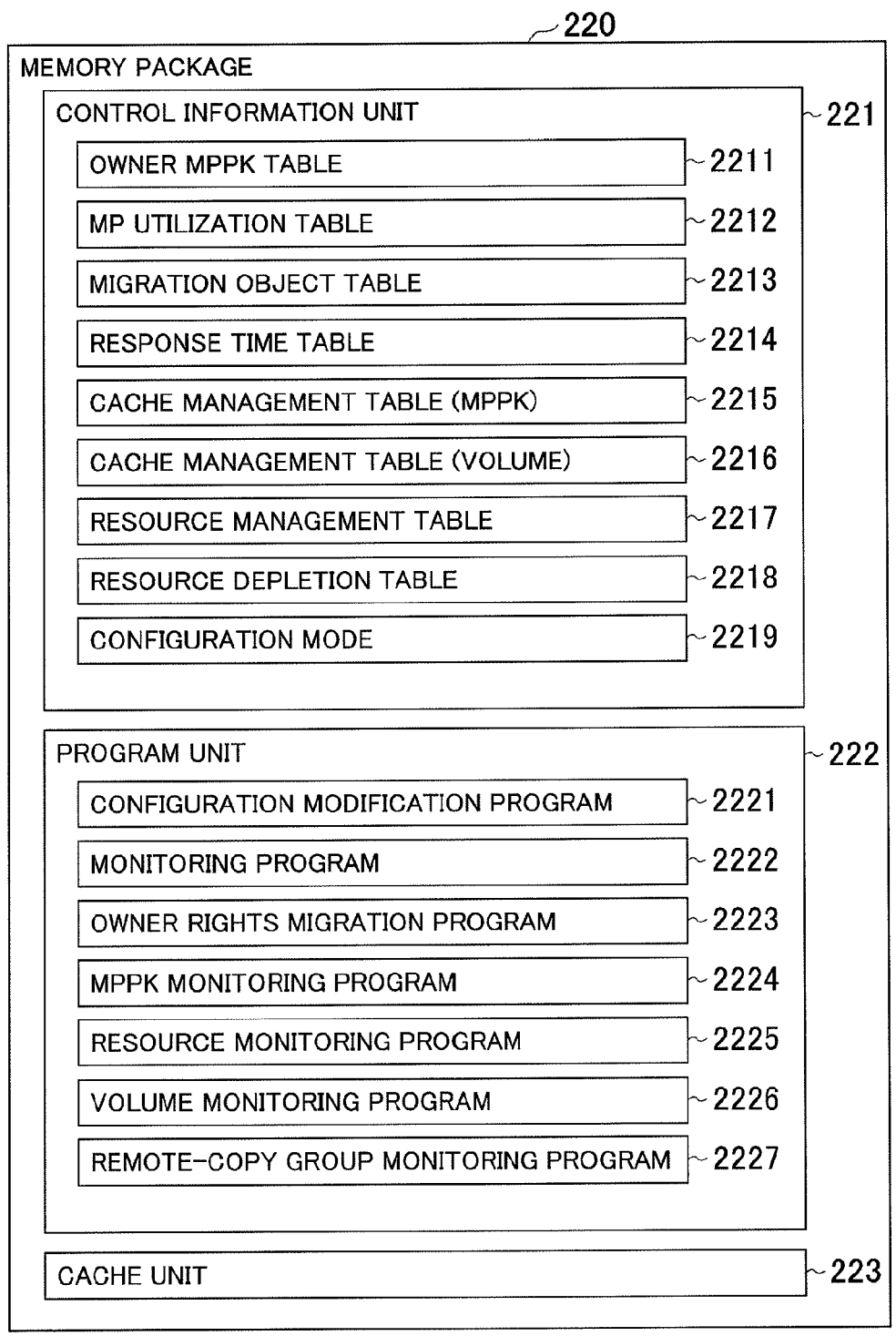
FIG. 2 is a block diagram showing control information of a storage apparatus according to this embodiment.

As shown in FIG. 2, the control information unit 221 in the memory package 220 of the storage apparatus 200 stores an owner MPPK table 2211, an MP utilization table 2212, a migration object table 2213, a response time table 2214, a cache management table (MPPK) 2215, a cache management table (volume) 2216, a resource management table 2217, a resource depletion table 2218 and a configuration mode 2219. Furthermore, the program unit 222 stores a configuration modification program 2221, a monitoring program 2222, an ownership migration program 2223, an MPPK monitoring program 2224, a resource monitoring program 2225, a volume monitoring program 2226, and a remote-copy group monitoring program 2227.

Note that various processing such as ownership migration is executed by the various programs mentioned earlier. Although the processing subject of the various processing in the following description is the programs or each of the parts which the programs comprise, it goes without saying that, in reality, it is the storage apparatus 100 which executes this processing on the basis of these programs and the like. Furthermore, the foregoing programs also function as management units for managing the MPPK 210 which possesses volume ownership.

Upon receiving I/O from the host apparatus 100, the frontend package 260 distributes an I/O request to the owner MPPK 210 of the I/O destination volume 250 on the basis of information of the volumes 250. The memory 262 in the FE package 260 stores a distribution destination MPPK table 263 as information for distributing I/O requests among the owner MPPK 210.

As shown in FIG. 3, the distribution destination MPPK table 263 is configured from a volume number field 2631 and a distribution-destination MPPK number field 2632. The volume number field 2631 stores numbers for uniquely identifying the volumes 250 in the storage apparatus 200. Furthermore, the distribution-destination MPPK number field 2632 stores identification numbers for the MPPK 210 which handle the processing of the volumes 250 identified by the volume numbers. The MPPK numbers are numbers for uniquely identifying the MPPK in the storage apparatus 200. Note that the distribution-destination MPPK table 263 may also be stored in the control information unit 221 of the memory package 220.

The control information which is stored in the control information unit 221 of the memory package 220 will be described next. The control information unit 221 of the memory package 220 stores the owner MPPK table 2211. The owner MPPK table 2211 is a table for managing which MPPK possesses which ownership.

Hereinabove, the ownership of the MPPK 210 were configured as control information which is associated with the volumes. However, one control information item is sometimes configured for a plurality of volumes in the storage apparatus. Examples include an intervolume copy function, a remote copy function which copies data between two storage apparatuses, and a volume virtualization function, and the like. In the case of the intervolume copy function, one control information item is configured for a pair comprising a copy source volume and a copy destination volume. Further, in the case of a remote copy function, one control information item is configured for a plurality of buffer volumes for storing transfer data which is transferred to the remote-copy destination storage apparatus. Here, a plurality of buffer volumes are pooled and described hereinbelow as a remote-copy group. Furthermore, in the case of the volume virtualization function, one control information item is configured for a plurality of pool volumes which the storage capacity pool comprises.

If one control information is configured for a plurality of volumes, a plurality of control information items can be managed collectively as one information item by configuring ownership for a copy destination volume and a remote-copy group or the like which form a pair. In this embodiment, the following description will cover not only the existence of ownership to one volume but also ownership to a remote-copy group, however, ownership to other groups and the like may also be provided.

The foregoing MPPK table 2211 manages ownership which are configured for volumes and remote-copy groups. As shown in FIG. 4, the owner MPPK table 2211 is configured from a type field 2211a, an identification number field 2211b, and an owner MPPK number field 2211c.

The type field 2211a stores information on the types of resources in the storage apparatus 200. For example, if the type is volume, this indicates that ownership to one volume are configured. Further, if the type is a remote-copy group, this indicates that ownership for one remote-copy group are configured. Furthermore, the identification number field 2211b stores information identifying resources belonging to each type. For example, if the type is volume, this field stores a number identifying a volume 250 in the storage apparatus 200 and, if the type is remote-copy group, this field stores a number identifying a remote-copy group in the storage apparatus 200. Furthermore, the owner MPPK number field 2211c stores MPPK numbers for the MPPK 210 handling the processing of resources (volumes or remote-copy groups) specified by the identification numbers.

The MP utilization table 2212 which is used when ownership is migrated according to the MP utilization of the MPPK 210 will be described next. The MP utilization table 2212 is a table for managing the MP utilization of the MPPK 210 and volumes 250. In this embodiment, the storage apparatus 200 determines the MPPL 210 which executes the processing of the volumes for each volume. Therefore, if a specific MPPK 210 is subject to a performance bottleneck due to an ownership configuration status or an I/O pattern from the host apparatus 100, the usage efficiency of the MPPK 210 for the whole apparatus may be reduced. In this case, the ownership for volumes of a suitable load can be migrated from the MPPK 210 subject to the bottleneck to an MPPK 210 with a lower load in order to be able to improve the usage efficiency of the MPPK 210. In addition, even when the MP utilization of a specific MPPK 210 is 100%, the MP utilization is desirably equal from one MPPK to the next MPPK. This is because the lower the MP utilization, the shorter the time until the processor will be free and the shorter the I/O response time. Hence, even if the MP utilization varies from one MPPK to the next MPPK, the performance of the storage apparatuses can be improved by migrating the ownership.

Hence, in this embodiment, ownership is migrated by referring to the MP utilization managed by the MP utilization table 2212 in the storage apparatus 200. As shown in FIG. 5, the MP utilization table 2212 is configured from a type field 2212a, an identification number field 2212b, and an MP utilization field 2212c. The type field 2212a stores information on the resource types in the storage apparatus 200, storing, for example, MPPK and volume and other such types. Further, the identification number field 2212b stores information identifying resources belonging to each type. For example, if the type is MPPK, this field stores a number identifying the MPPK 210 in the storage apparatus 200 and if the type is volume, this field stores numbers identifying volumes 250 in the storage apparatus 200. The MP utilization field 2212c then stores the utilization of the MPPK 210 or volumes 250 specified by the identification numbers.

Here, if the type is MPPK, the MP utilization field 2212c stores a value indicating the proportion of processors in the MPPK used per unit of time. Further, if the type is volume, the MP utilization field 2212c stores a value indicating the proportion by which the processor is used for one volume. For example, when the MP utilization of a certain MPPK 210 is 50%, the total MP utilization of the volumes to which the MPPK 210 possesses ownership is 50%.

In addition, copy pair may be added to the types in the MP utilization table 2212 and the load of the copy processing on the copy pair may also be managed. For example, where the intervolume copy processing load is concerned, the load may be recognized as being divided into a copy-source volume load and a copy-destination volume load, may be recognized collectively as a copy-source volume load, or may be recognized as the load of the whole copy processing. Likewise, the load of the remote copy processing may also be recognized as a buffer volume load or recognized collectively as the load of the whole remote copy processing.

The exclusion of MPPK, volumes and remote-copy groups from the dynamic ownership migration object will be described next. As a result of excluding a specific MPPK from the ownership migration object, ownership is migrated from another MPPK to make it possible to avoid a reduction in the I/O processing performance of the volume 250 with pre-migration ownership. Note that the migration of ownership to another MPPK from the MPPK 210 configured as an ownership migration object may be allowed or may be prohibited. This is because there is no reduction in performance caused by migration since the ownership migration source has a reduced load due to migration. Note that, although the migration of ownership from the MPPK 210 configured as the ownership migration object to another MPPK is described as being prohibited, this migration may also be allowed.

Furthermore, by performing configuration to exclude a specific volume 250 from the ownership migration object so as to not migrate the ownership to the volume 250, a reduction in performance of the volume due to migration can be avoided. In addition, configuration may be performed to exclude volumes for which the costs of ownership migration processing itself are high, from the ownership migration object. Note that the costs of ownership migration processing differ for each volume. For example, migration processing costs increase for volumes which have a lot of management information cached in the local memory in the MPPK 210. This is because a lot of control information of the MPPK 210 which is the ownership migration destination must be introduced to the local memory 212 from the control information unit 221. So too for the remote-copy groups, by configuring remote-copy groups excluded from the ownership migration object for the same reasons as for a case where ownership to the volume 50 are migrated, a reduction in the performance of each volume due to migration can be avoided.

The migration object table 2213 for managing whether or not MPPKs, volumes and remote-copy groups are ownership migration objects will be described next. As shown in FIG. 6, the migration object table 2213 is configured from a type field 2213a, an identification number field 2213b and a migration flag field 2213c. The type field 2213a stores information on the types of resources in the storage apparatus 200. The identification number field 2213b stores information identifying resources belonging to each type. Furthermore, the migration flag field 2213c stores information indicating whether or not resources such as MPPK identified by the identification numbers are ownership migration objects. For example, this field stores ON if a resource is an ownership migration object and stores OFF if the resource is not an ownership migration object.

An input screen for configuring the foregoing MPPK, volumes and remote-copy groups as an ownership migration object or otherwise will be described next. The input screen is an input screen which is displayed on the display screen of the I/O unit 274 of the service processor 270. As shown in FIG. 7, the I/O unit 274 of the service processor 270 outputs an MPPK-unit migration object configuration modification screen 300 and a volume-unit migration object configuration screen 350.

The MPPK-unit configuration modification screen 300 is a screen for modifying the MPPK configuration. The check box 310 of the configuration modification screen 300 is used to select whether or not the MPPK are migration objects in MPPK units. Furthermore, the volume-unit configuration modification screen 350 is a screen for modifying volume configuration. The check box 360 on the configuration modification screen 350 is used to elect whether or not volumes are migration objects in volume units. For example, in FIG. 7, MKKP0 and a volume having the volume number 35 are configured so as to be non-migration objects. When an Apply settings button 340 is pressed after checkbox 310 or checkbox 360 is configured, the configuration content is reported to the storage apparatus 200. Furthermore, the screen, used to configure whether ownership of remote-copy groups can be migrated, may be displayed on the I/O unit 274 similarly to the configuration modification screen 300 or 350 shown in FIG. 7.

Upon receiving the configuration modification instruction content which is configured in the configuration modification screen 300 or 350 from the service processor 270, the storage apparatus 200 executes the configuration content modification processing by starting the configuration modification program 2221 stored in the program unit 222 of the memory package 220.

Figure 8:
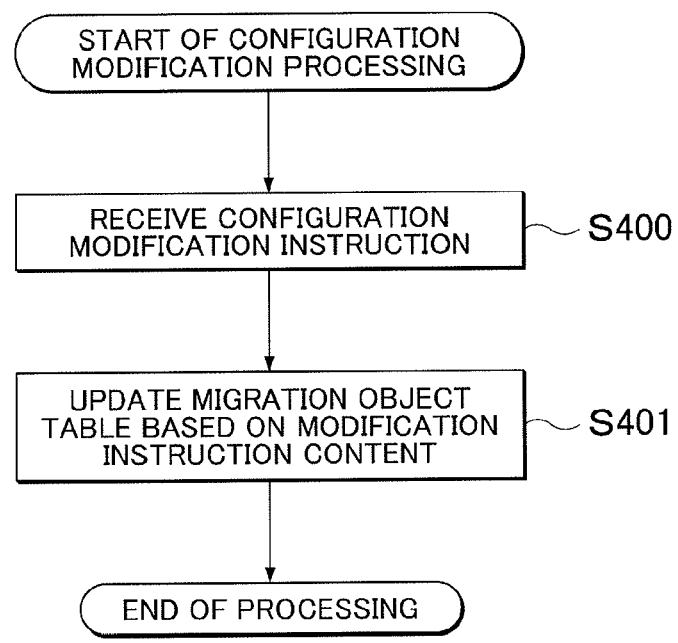
FIG. 8 is a flowchart showing processing content for configuration content modification processing according to this embodiment.

Processing for modifying the configuration content according to the configuration modification program 2221 will be described next. As shown in FIG. 8, the configuration modification program 2221 receives the modified instruction content of the configuration modification from the service processor 270 (S400). More specifically, the configuration modification program 2221 receives information of non-migration object MPPK, volumes or remote-copy groups from the service processor 270. Furthermore, the configuration modification program 2221 updates the migration object table 2213 based on the modification instruction content received in step S400 (S401) and terminates the processing.

Ownership dynamic migration processing which considers whether or not the MPPK and so on are migration objects will be described next. As mentioned hereinabove, if the MPPK, volumes or remote-copy groups are configured as ownership non-migration objects, ownership dynamic migration processing must be executed by considering the details of the configuration. The monitoring program 2222 stored in the program unit 222 of the memory package 220 is a program which dynamically migrates ownership by checking the MP utilization of the MPPK 210 in the storage apparatus 200 at regular intervals and detecting an MPPK performance bottleneck or variations in the MP utilization, or the like.

Figure 9:
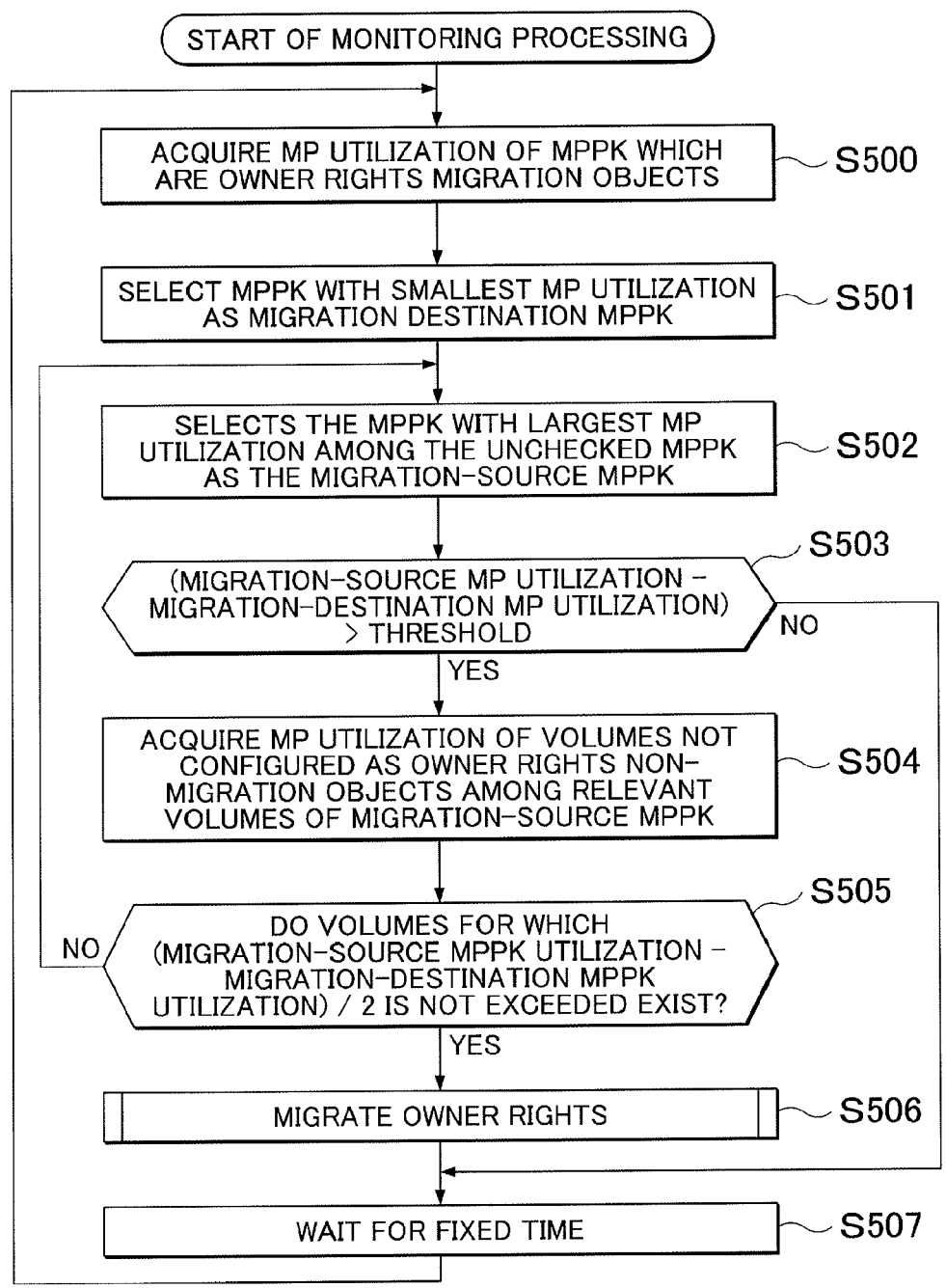
FIG. 9 is a flowchart showing processing content for ownership dynamic migration processing according to this embodiment.

As shown in FIG. 9, the monitoring program 2222 first refers to the migration object table 2213 and MP utilization table 2212 to acquire the MP utilization of all the MPPK 210 which are to serve as ownership migration objects (S500). The monitoring program 2222 selects the MPPK 210 with the smallest MP utilization among the MPPK 210 acquired in step S500, as the migration destination MPPK (S501).

The monitoring program 2222 subsequently selects the MPPK 210 with the largest MP utilization as the migration source MPPK among the MPPK 210 acquired in step S500 (S502). The MPPK 210 are migration source candidates at the selection stage in step S502. The monitoring program 2222 then determines whether or not the difference between the MP utilization of the migration source MPPK selected in step S502 and the MP utilization of the migration destination MPPK selected in step S501 (S503).

In step S503, if the difference between the migration-source MPPK and the migration-destination MPPK is not equal to or more than the threshold, the monitoring program 2222 determines that there is no load variation between the MPPK and there is no need to execute ownership migration, and, after a fixed time has elapsed, advances to step S507 to execute the processing of step S500 and subsequent steps.

If, on the other hand, it is determined in step S503 that the difference in the MP utilization between the migration-source MPPK and migration-destination MPPK is equal to or more than the threshold, the monitoring program 2222 acquires the volume-unit MP utilization of the volume for which the migration-source MPPK possesses ownership (S504). The monitoring program 2222 then determines whether or not a volume exists which has an MP utilization which does not exceed the value of Equation (1) below (S505).

$$\text{(Migration-source MPPK utilization−migration-destination MPPK utilization)}/2 \qquad (1)$$

If it is determined in step S505 that a volume for which equation (1) is satisfied exists, the monitoring program 2222 executes ownership migration using the ownership migration program 2223 (S506). The ownership migration processing in step S506 will be described in detail subsequently. Note that, the reason why a search for volumes with an MP utilization not exceeding equation (1) is performed in step S505 is as follows. That is, because a volume having the MP utilization exceeding equation (1) is migrated from the migration-source MPPK to the migration-destination MPPK, the load of equation (1) can be migrated from the migration-source MPPK to the migration-destination MPPK to enable the loads of the migration-destination and migration-source MPPK to be equalized. Note that if, in step S506, there is a plurality of volumes which satisfy the conditions of equation (1), the MP utilization of the migration-source and migration-destination MPPK can be further equalized by taking the ownership of the volume with the largest MP utilization as the migration object.

If, on the other hand, it is determined in step S505 that there is no volume satisfying the equation (1), the monitoring program 2222 returns to step S502 and executes the processing of steps S502 to S506 on the MPPK with the second highest MP utilization.

Furthermore, the threshold which is used in step S503 may be pre-configured as 10%, for example. In this case, if the difference in MP utilization between the migration-source MPPK and the migration-destination MPPK is equal to or more than 10%, processing is executed to equalize the MP utilization between the MPPKs by migrating the ownership. Furthermore, there may be an arrangement whereby, if the MP utilization of the MPPK with the highest MP utilization is equal to or less than a predetermined threshold, ownership is not migrated even when the MP utilization across the MPPK exceeds the threshold. In addition, the threshold used in step S503 may also be changed depending on the value of the MP utilization. For example, there may be an arrangement whereby, if the largest MP utilization is equal to or more than 90%, ownership is migrated even when the difference in MP utilization is 5%. The threshold configuration may be determined based on the costs of processing to migrate ownership and the effect obtained by the ownership migration.

Further, the same processing as the monitoring processing shown in FIG. 9 can also be implemented when remote-copy group ownership is migrated. However, if remote-copy group ownership is migrated, the determination is made by using the load of the remote copy processing in step S505 above. For example, if the load of the remote copy processing is registered as the buffer volume load, reference is made to the MP utilization table 2212 in order to be able to acquire the load of the remote copy processing by totaling up the MP utilization of all the buffer volumes.

Figure 10:
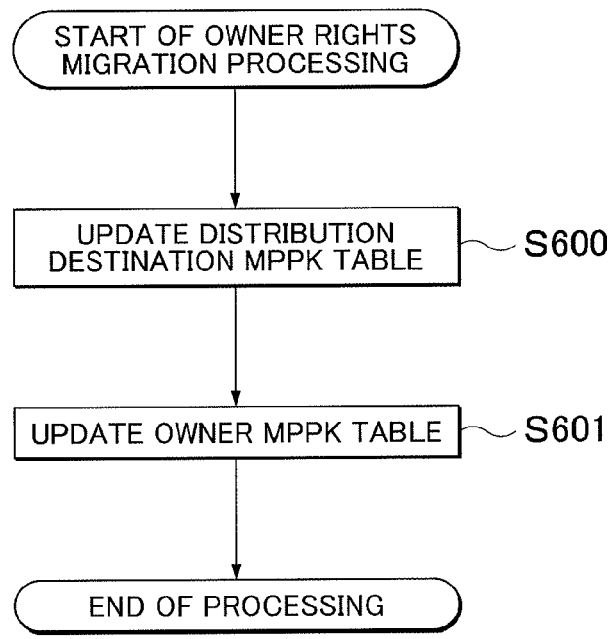
FIG. 10 is a flowchart showing processing content for ownership migration processing according to this embodiment.

The ownership migration processing in step S506 above which is executed by the monitoring program 2222 will be described next. The ownership migration processing is executed by the ownership migration program 2223. As shown in FIG. 10, the ownership migration program 2223 first updates the distribution destination MPPK table 263 (S600). The ownership migration program 2223 then updates the owner MPPK table 2211 (S601) and terminates the processing. More specifically, when updating the distribution destination MPPK table 263 and the owner MPPK table 2211, the ownership migration program 2223 modifies the MPPK numbers, in the tables which correspond to the migration object volumes, to the MPPK numbers of the migration-destination MPPK. As a result, the I/O requests which are newly transmitted from the host apparatus 100 are processed by the migration-destination MPPK. In addition, if the ownership in the remote-copy group are migrated, it is unnecessary to update the distribution destination MPPK table (step S600).

The ownership migration processing can be executed while I/O requests from the host are received. In other words, the storage apparatus 200 is able to migrate ownership source. This processing is disclosed in PTL2 and a detailed explanation is not without stopping the task processing which is running on the host apparatus 100. More specifically, after switching the I/O request distribution destination from the migration-source MPPK to the migration-destination MPPK, the FE package 260 is able to perform implementation of ownership migration by not starting the I/O request processing which is assigned to the migration-destination MPPK until there are no more I/O requests being executed at the migration included in the description of the invention. Ownership can also be migrated while I/O requests are received according to the present invention by means of the same procedure.

A method for excluding specific MPPK and volumes designated by the operator or the like from the ownership migration objects was described hereinabove. Hereinafter, a method will be described in which the storage apparatus 200 searches for MPPK, volumes, or remote-copy groups which are ownership non-migration objects and presents the same to the user.

First, the method in which the storage apparatus 200 searches for the MPPK and so on which are not migration-destination targets will be described. The following three methods are examples of methods for searching for non-migration destination target MPPK.

(b-1) Method for searching for non-migration object MPPK based on the I/O response.

(b-2) Method for searching for non-migration object MPPK based on information for configuring remote-copy groups.

(b-3) Method for searching for non-migration object MPPK based on resource depletion status. Each of the methods is described in detail hereinbelow.

(b-1) Method for Searching for Non-Migration Object MPPK Based on I/O Response.

Hereinafter, the I/O average response time or average processor wait time is managed in MPPK units or volume units and this information is used to determine whether or not an MPPK is an ownership migration object.

The response time table 2214 for managing I/O average response times will be described first. As shown in FIG. 11, the response time table 2214 is configured from a type field 2214a, an identification number field 2214b, and a response time field 2214c. The type field 2214a stores information on the type of resources in the storage apparatus 200 and stores, for example, types such as MPPK and volume. The identification number field 2214b stores information identifying resources belonging each type. The response time field 2214c stores I/O average response times in volume units or MPPK units. Although the I/O response times are used for the values stored in the response time field 2214c in FIG. 11, the invention is not limited to this arrangement; for example, the processor unused wait time may be used or information affecting the I/O response time may be used, such as the average unused wait time for the resources provided in the other MPPK units.

Figure 12:
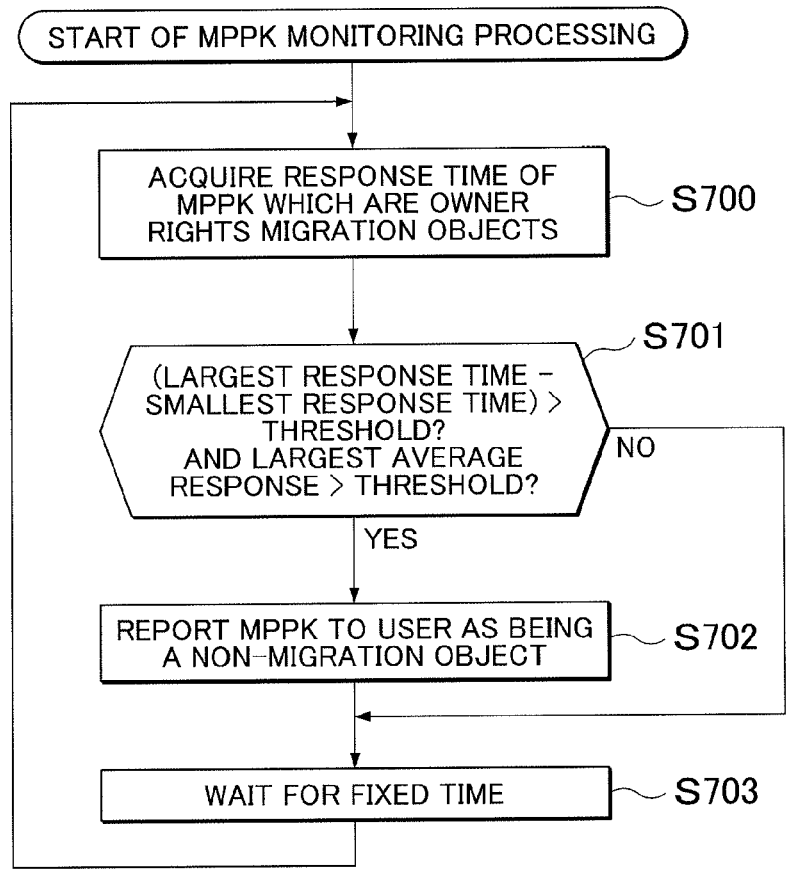
FIG. 12 is a flowchart showing processing content for MPPK monitor processing according to this embodiment.

MPPK monitoring processing which presents non-migration object MPPK to the user based on the I/O response time will be described next. As shown in FIG. 12, the MPPK monitoring program 2224 first refers to the migration object table 2213 and the response time table 2214 and acquires a response time of all the MPPK 210 which are ownership migration objects (S700). Furthermore, the MPPK monitoring program 2224 determines whether or not an MPPK 210 which satisfies the following two conditions exists (S701).

(Condition 1) The difference between the largest and smallest values for the response time is equal to or more than the threshold (Condition 2) The largest value is equal to or more than another threshold If it is determined in step S701 that there is an MPPK 210 which satisfies conditions 1 and 2, the MPPK 210 is reported to the user as non-migration object MPPK (S702). If, on the other hand, it is determined in step S701 that an MPPK 210 which satisfies conditions 1 and 2 does not exist, the MPPK monitoring program 2224 moves to step S703 and, after a fixed time has elapsed, repeats the processing of step S700 and subsequent steps.

Through the foregoing MPPK monitoring processing by the MPPK monitoring program 2224, an MPPK 210 with a worse response time than the other MPPK can be sought and presented to the user. Furthermore, the determination conditions in step S701 may be determined by using only condition 1. Moreover, the determination condition in step S701 may also be determined using only Condition 2. In addition, an MPPK 210 with the response time 0 may be excluded as a target for the selection of the largest and smallest values.

Method for Searching for Non-Migration Object MPPK Based on Remote-Copy Group Configuration Information Typically, for the processing times of inter-volume copy processing and remote copy processing by the storage apparatus 200, the processor occupancy time is longer than I/O processing time. The response thus readily deteriorates for I/O executed in an MPPK 210 which has remote-copy group ownership. It is therefore possible to avoid a worsening of the response caused by ownership migration by excluding owner remote-copy group MPPK from the ownership migration objects.

Figure 13:
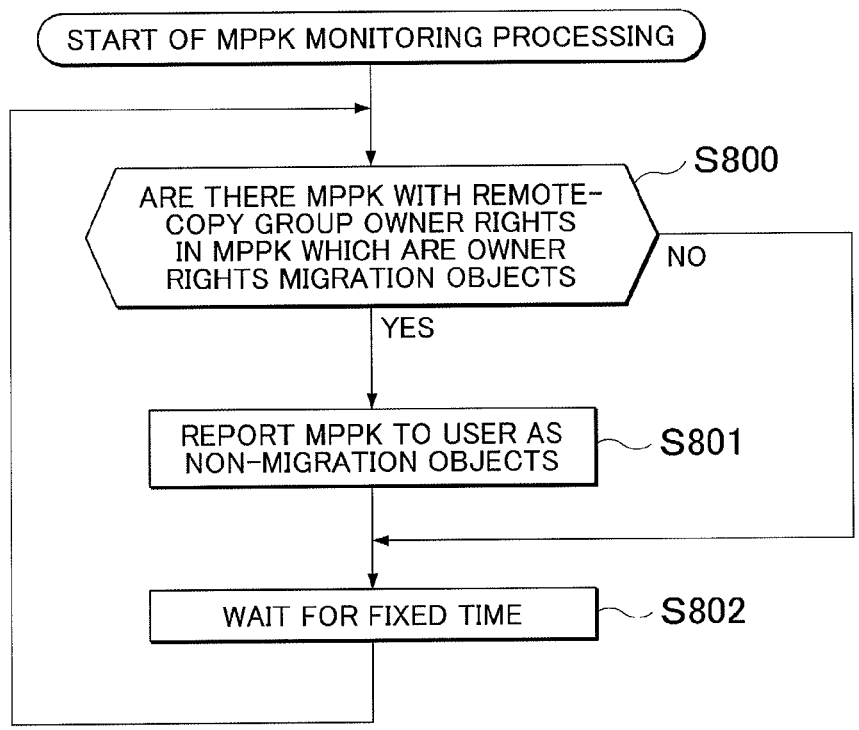
FIG. 13 is a flowchart showing processing content of MPPK monitor processing according to this embodiment.

MPPK monitoring processing, by the MPPK monitoring program 2224, which searches for non-migration object MPPK 210 on the basis of remote-copy group configuration information will be described next. As shown in FIG. 13, the MPPK monitoring program 2224 refers to the owner MPPK table 2211 and the migration object table 2213 and determines whether there are MPPK 210 which satisfy the following condition (S800).

(Condition 3) An MPPK which is an ownership migration object possesses remote-copy group ownership.

If, in step S800, it is determined that there is an MPPK 210 which satisfies condition 3, the MPPK monitoring program 2224 reports the MPPK 210 to the user as a non-migration object MPPK (S801) and moves to step S802.

If, on the other hand, it is determined in step S800 that an MPPK 210 which satisfies the condition 3 does not exist, the MPPK monitoring program 2224 repeats the processing of step S800 and subsequent steps after a fixed time has elapsed (S802).

Accordingly, through the foregoing MPPK monitoring processing, a remote-copy group owner MPPK can be sought and presented to the user as the non-migration object MPPK 210. If the MP utilization is low even when a remote-copy group owner MPPK is configured, a condition that the MP utilization should be equal to or more than a fixed value may be added to the determination condition of step S800 because it is thought to be no problem even when ownership are migrated to the MPPK. In addition, the remote copy processing operates according to a write request from the host apparatus 100 and hence, in addition to the MP utilization, the proportion of write requests in the I/O count may also be considered.

Furthermore, there may be an arrangement such that, if all the MPPK 210 are remote-copy group owner MPPK, no MPPK 210 are presented to the user as non-migration objects. The arrangement may also be such that no MPPK are presented to the user as non-migration objects if a fixed number of MPPK or more are remote-copy group owner MPPK. Furthermore, the arrangement may be such that only in cases where one MPPK 210 has ownership to a plurality of remote-copy groups, the MPPK 210 is presented to the user as an ownership non-migration object. In addition, an ownership non-migration object MPPK 210 may also be presented to the user by combining the foregoing methods.

(b-3) Method for Searching for a Non-Migration Object MPPK Based on a Depleted Resources State Resources such as the cache in the migration-destination MPPK 210 are sometimes depleted through ownership migration, causing a lower performance than before migration. Hereinafter, a method in which MPPK with depleted resources are sought and these MPPK are presented to the user as non-migration object MPPK will be described. First, control information for managing resources provided in the MPPK units will be described and then the process flow for processing for searching for MPPK 210 with depleted resources will be described.

The MPPK cache management table 2215 for managing the cache capacity and usage rate of each MPPK will first be described. As shown in FIG. 14, the cache management table 2215 is configured from an MPPK number field 2215a, a capacity field 2215b, a cache usage rate field 2215c, a clean ratio field 2215d, and a dirty ratio field 2215e.

The MPPK number field 2215a stores numbers for uniquely identifying the MPPK 210. The capacity field 2215b stores information indicating the cache capacity of the MPPK 210 identified by the MPPK numbers. The cache usage rate field 2215c stores information indicating the usage rate of the cache assigned to each MPPK 210. The clean ratio field 2215d stores information indicating the ratio of the clean cache data to the cache capacity. Furthermore, the dirty ratio field 2215e stores information indicating the ratio of the dirty cache data to the cache capacity. Where the clean cache data is concerned, if the data stored in the hard disk drive 240 and the data in the cache are the same, the data in the cache is called clean cache data. Data in the cache which, after being written from the host apparatus 100 to the storage apparatus 200 and stored in the cache, has not yet been written to the hard disk drive 240 is called dirty cache data.

The volume cache management table 2216 for managing the cache capacity and usage rate for each volume will be described next. As shown in FIG. 15, the cache management table 2216 is configured from a volume number field 2216a, a cache usage rate field 2216b, a clean ratio field 2216c and a dirty ratio field 2216d.

The volume number field 2216a stores numbers number for uniquely identifying volumes 250. The cache usage rate field 2216b stores information indicating the usage rate of cache assigned to each volume 250. The clean ratio field 2216c stores information indicating the ratio of clean cache data to the cache capacity. Furthermore, the dirty ratio field 2216d stores information indicating the ratio of dirty cache data to the cache capacity.

The resource management table 2217 in which resources other than the cache are managed will be described next. As shown in FIG. 16, the resource management table 2217 is configured from a type field 2217a, an identification number field 2217b, a local memory field 2217c, a data transfer buffer field 2217d, an I/O multiplicity field 2217e, and a copy job multiplicity field 2217f.

The type field 2217a stores information on the types of resources in the storage apparatus 200. The identification number field 2217b stores information identifying the resources belonging to each type. The local memory field 2217c stores information indicating the usage rate of the local memory which the MPPK 210 comprises. The data transfer buffer field 2217d stores information indicating the usage rate of the data transfer buffer of the MPPK 210. The I/O multiplicity field 2217e stores information indicating the usage rate of the I/O multiplicity of the MPPK 210. The copy job multiplicity field 2217f stores information indicating the usage rate of the copy job multiplicity of the MPPK 210. Here, the I/O multiplicity and copy job multiplicity signify the multiplicity of the I/O and the multiplicity of the copy jobs which each MPPK 210 issues to the hard disk drive 240. The multiplicity of the I/O issued from the host apparatus 100 to the storage apparatus 200 is limited according to the resources of the storage apparatus 200 and restricted by the multiplicity of the jobs which can be started for the I/O processing.

Resource monitoring processing in which MPPK which are depleted based on resources managed in the foregoing MPPK cache management table 2215, the volume cache management table 2216, and the resource management table 2217 are sought and presented to the user will be described next.

Figure 17:
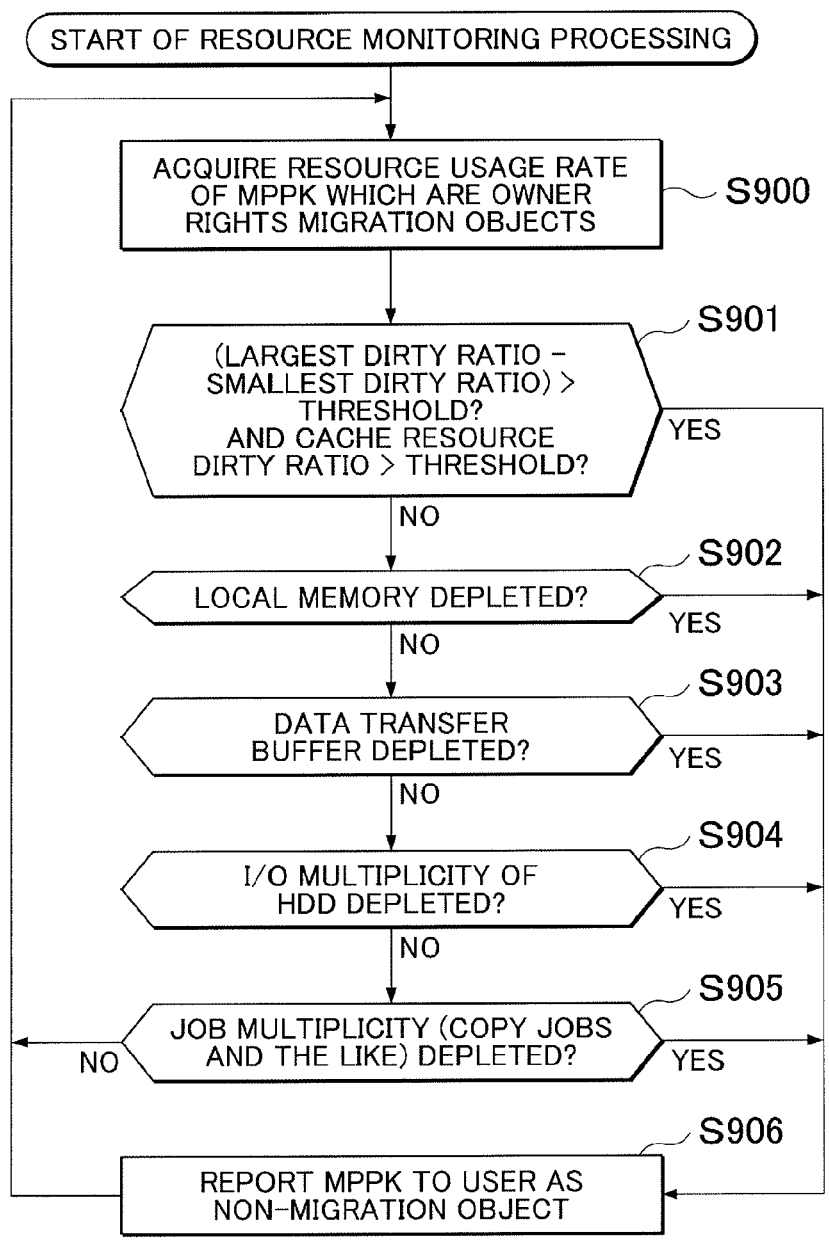
FIG. 17 is a flowchart showing processing content of resource monitoring processing according to this embodiment.

As shown in FIG. 17, the resource monitoring program 2225 first refers to the migration object table 2213, the MPPK cache management table 2215, the volume cache management table 2216 and the resource management table 2217 and acquires the resource usage rate of all the ownership migration objects MPPK (S900).

The resource monitoring program 2225 then determines whether or not an MPPK 210 which satisfies the following two conditions exists (S901).

(Condition 4) Largest dirty ratio−smallest dirty ratio>threshold (Condition 5) Cache resource dirty ratio>threshold The reason why the resource depletion status is determined from a dirty ratio in step S901 will now be described. The cache is an area for temporarily storing task data and therefore, if the cache is depleted, an unused area can be created in the cache by discarding the cache data. Here, since data need only be discarded from the cache if the cache data is clean cache data, unused area can be created at high speed. If, however, the cache data is dirty cache data, the data must be temporarily written to the hard disk drive 240 and therefore unused area cannot be created instantly. On that basis, the cache depletion state is determined from the dirty ratio in step S901. Furthermore, if it takes time to discard the clean cache data, the cache depletion status may be determined from the usage rate of the cache which also contains the clean cache data.

Furthermore, the resource depletion status may be determined not only by the resource usage rate as mentioned earlier, but also based on the number of times the reservation of resources fails. More specifically, the number of times the resource reservation fails may be managed and the determination that resources are depleted may be made if the number of times resource reservation fails is equal to or more than a predetermined threshold.

The resource depletion table 2218 for managing the number of times resource reservation fails will now be described. As shown in FIG. 18, the resource depletion table 2218 is configured from an MPPK number field 2218a, the resource type field 2218b and a reservation failure count field 2218c. The MPPK number field 2218a stores a number for uniquely identifying the MPPK 210. The resource type field 2218b stores information indicating the types of resources such as, for example, the cache, the local memory, the data transfer buffer, the I/O multiplicity, or the job multiplicity. The reservation failure count field 2218c stores information indicating the number of times resource reservation fails per unit of time. The processing for counting the number of times resource reservation fails is implemented in resource reservation processing by adding 1 to the value in the reservation failure count field of the resource depletion table 2218 if the corresponding resources cannot be reserved.

Returning now to FIG. 17, if it is determined in step S901 that there is an MPPK 210 which satisfies the foregoing conditions 4 and 5, the resource monitoring program 2225 reports the MPPK 210 with the largest dirty ratio to the user as an ownership non-migration object MPPK (S906).

If, however, it is determined in step S901 that there is no MPPK 210 which satisfies the foregoing conditions 4 and 5, the resource monitoring program 2225 determines whether or not the local memory is depleted (S902). The resource monitoring program 2225 advances to step S906 if it is determined in step S902 that the local memory is depleted.

Meanwhile, if it is determined that the local memory is not depleted in step S902, the resource monitoring program 2225 determines whether or not the data transfer buffer is depleted (S903). If it is determined in step S903 that the data transfer buffer is depleted, the resource monitoring program 2225 advances to step S906.

Meanwhile, if it is determined in step S903 that the data transfer buffer is not depleted, the resource monitoring program 2225 determines whether or not the I/O multiplicity of the hard disk drives (HDD) is depleted (S904). If it is determined in step S904 that the I/O multiplicity of the hard disk drives is depleted, the resource monitoring program 2225 advances to step S906.

Meanwhile, if it is determined in step S904 that the I/O multiplicity in the hard disk drive is not depleted, the resource monitoring program 2225 determines whether or not the job multiplicity (copy jobs and so on) is depleted (S905). If it is determined in step S905 that the job multiplicity is depleted, the resource monitoring program 2225 advances to step S906.

Meanwhile, if it is determined in step S905 that the job multiplicity is not depleted, the resource monitoring program 2225 returns to step S900 and repeats the processing of step S900 and beyond.

A search for MPPK 210 with depleted resources can be made by executing the foregoing resource monitoring processing in this way and these MPPK can be presented to the user as non-migration object MPPK.

Typically, resource depletion can be determined based on whether the usage rate of each resource is 100%. If the higher the usage rate of the resource, the longer the time taken for resource reservation, it may be determined that the resources are depleted if a fixed threshold is exceeded. For example, the resource depletion status may also be determined based on an increase in overhead for finding unused resources and an increase in the overhead for creating unused area.

A method whereby the storage apparatus 200 searches for non-migration destination target volumes will be described next. Volumes and remote-copy groups which should be configured as non-migration objects are, for example, volumes and remote-copy groups with excessively large migration costs and volumes and remote-copy groups for which processing continuously occupying the processing for long periods is readily executed. The following two methods are examples of methods for searching for non-migration object volumes.

(c-1) Method for finding non-migration object volumes and the like based on the usage rates of volumes and remote-copy groups.

(c-2) Method for finding non-migration object volumes and the like based on the remote-copy group configuration status.

Each of these methods will be described in detail hereinbelow.

(c-1) Method for Finding Non-Migration Object Volumes Based on the Usage Rates of the Resources of Volumes and Remote-Copy Groups Volume monitoring processing in which volumes which are best excluded from the ownership migration objects are sought and presented to the user will be described first.

Figure 19:
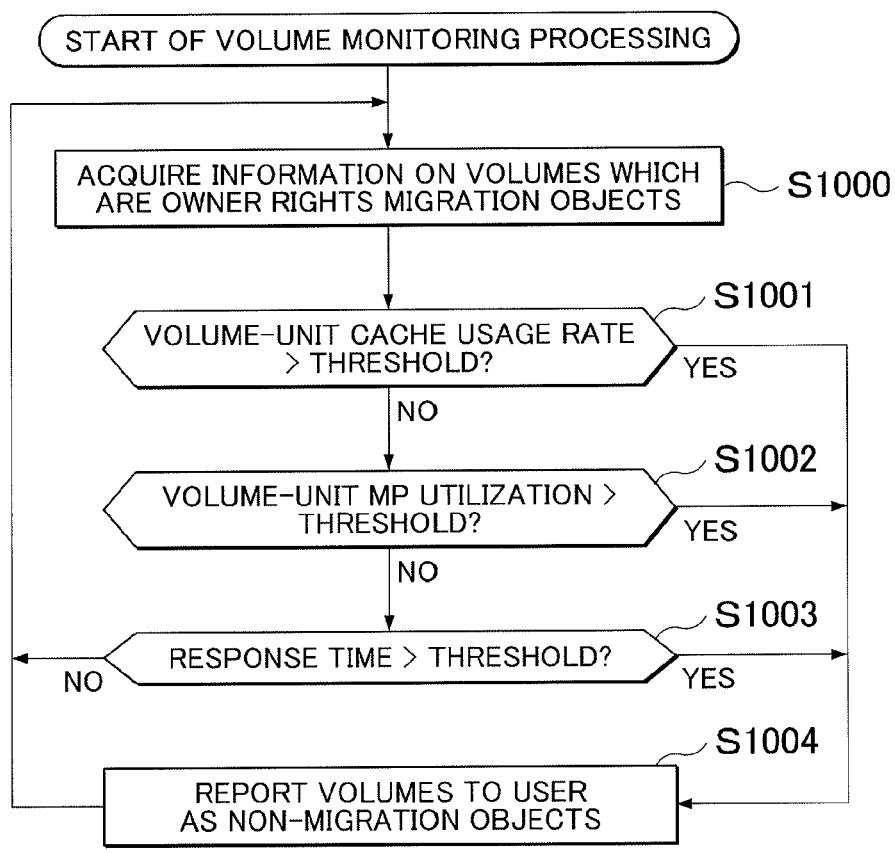
FIG. 19 is a flowchart showing processing content of volume monitoring processing according to this embodiment.

As shown in FIG. 19, the volume monitoring program 2226 acquires information on volumes which are ownership migration objects (S1000). More specifically, the volume monitoring program 2226 refers to the migration object table 2213, the cache management table (volume) 2215, the resource management table 2217, the MP utilization table 2212, and the response time table 2214 to acquire the resource usage rate, MP utilization and response time (or processor unused wait time) of all the volumes which are ownership migration objects.

The volume monitoring program 2226 determines whether the cache usage rate of the volume units acquired in step S1000 is equal to or more than a predetermined threshold (S1001). The determination in step S1001 is not limited to the volume-unit cache usage rate and may be determined based on the cache dirty ratio and clean ratio. If it is determined in step S1001 that the cache usage amount of the volume units is equal to or more than the threshold, the volume monitoring program 2226 renders the volumes ownership non-migration object volumes and presents these volumes to the user (S1004).

If, on the other hand, it is determined in step S1001 that the cache usage amount of the volume units is not equal to or more than the threshold, the volume monitoring program 2226 determines whether or not the volume MP utilization is equal to or more than the predetermined threshold (S1002). If it is determined in step S1002 that the volume MP utilization is equal to or more than a predetermined threshold, the volume monitoring program 2226 presents the volume to the user as an ownership non-migration object volume (S1004).

Meanwhile, if it is determined in step S102 that the volume MP utilization is not equal to or more than the predetermined threshold, the volume monitoring program 2226 determines whether or not the response time of the volume (or the processor wait time) is equal to or more than the threshold (S1003). If it is determined in step S103 that the volume response time is equal to or more than the threshold, the volume monitoring program 2226 presents the volume to the user as an ownership non-migration object volume (S1004).

If, however, it is determined in step S103 that the volume response time is equal to or more than the threshold, the volume monitoring program 2226 returns to step S1000 and repeats the processing of step S1000 and subsequent steps on the ownership migration object volume.

The volume unit ownership in the volume monitoring processing were described hereinabove but non-migration object volumes may also be specified by executing the same processing for remote-copy group ownership. For example, in step S1001, it may be determined whether the total of the cache usage rates of all the volumes targeted for remote-copy processing is equal to or more than a threshold. This is because, if remote-copy group ownership are migrated, the ownership of all the volumes targeted for remote-copy processing must be migrated all together.

Furthermore, it may be determined in step S1002, for example, whether the total of the MP utilization of all the volumes targeted for the remote copy processing is equal to or more than the threshold. In addition, if processing exists which is not executed on the volumes during remote-copy processing, MP utilization is managed separately and it may be determined whether this MP utilization and the total MP utilization of the volumes is equal to or more than the threshold. This determination may also be made by adding the total MP utilization of the volumes to the MP utilization of a specific buffer volume.

It may also be determined in step S1003, for example, whether the average value of the response time of all the volumes targeted by remote-copy processing is equal to or more than the threshold. Further, as for the MP utilization, for processing which is not executed on the volumes, the response time (or processor unused wait time) of this processing is managed separately and it may be determined whether the response time of the processing and the average value of the response time of the volume units is equal to or more than the threshold.

(c-2) Method for Searching for Non-Migration Object Volumes Based on the Remote-Copy Group configuration status As mentioned earlier, typically, in the storage apparatus 200, the remote-copy processing time occupies the processor for a longer time than the I/O processing time. For this reason, the average processor unused wait time of a remote-copy group owner MPPK is longer than for the other MPPK which do not possess remote-copy group ownership. If, therefore, remote-copy group ownership are moved, the I/O response time for the corresponding volume in the migration-destination MPPK is likely to be worse than before the migration. It is therefore considered to be better to exclude remote-copy groups on which remote-copy processing is frequency executed from the ownership migration objects. Remote-copy group monitoring processing, which involves searching for the remote-copy group which is causing the worsening of the response time and presenting the volume belonging to the remote-copy group to the user as non-migration objects will be described hereinbelow.

Figure 20:
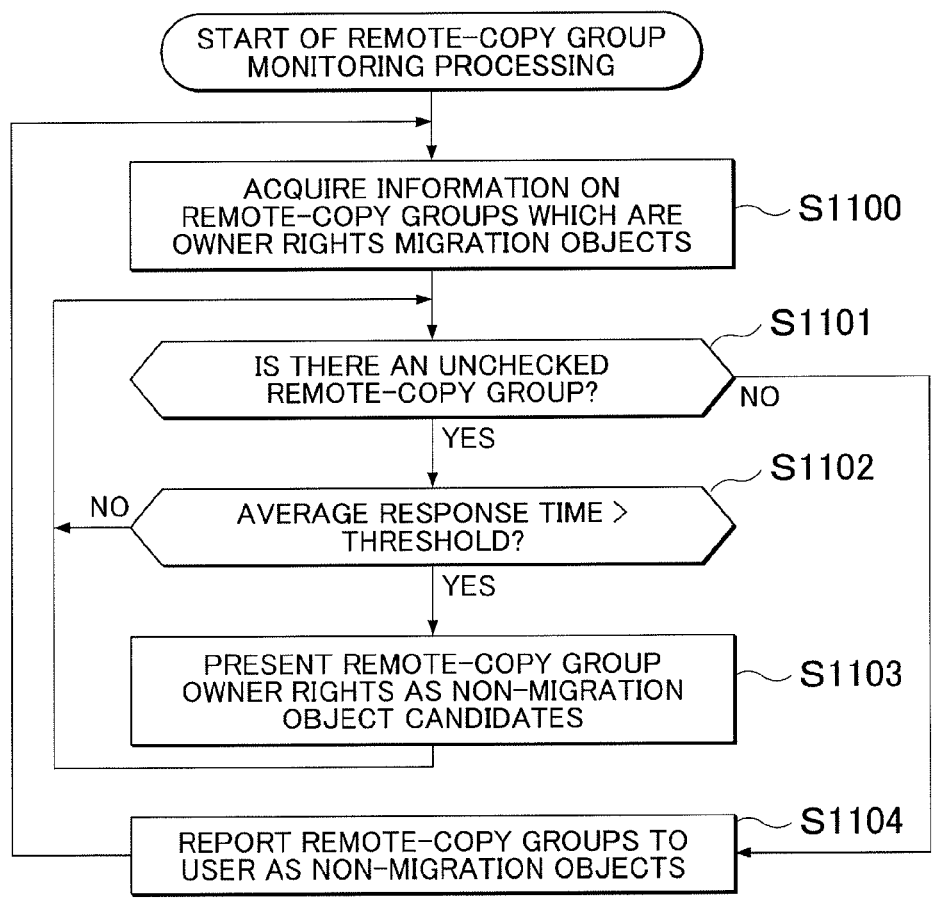
FIG. 20 is a flowchart showing processing content of remote-copy group monitoring processing according to this embodiment.

First, as shown in FIG. 20, the remote-copy group monitoring program 2227 acquires information of remote-copy groups which are ownership migration objects (S1100). More specifically, the remote-copy group monitoring program 2227 refers to the migration object table 2213 and the owner MPPK table 2211 to acquire information of all the remote-copy groups which are ownership migration objects and the MPPK with ownership.

Furthermore, the remote-copy group monitoring program 2227 determines whether a check of all the remote-copy groups acquired in step S1100 is complete, that is, whether the processing of step S1102 and subsequent steps has been executed for all the remote-copy groups (S1101). Further, if it is determined in step S1101 that the check of all the remote-copy groups is complete, the remote-copy group monitoring program 2227 advances to step S1104 and, after a certain time has elapsed, moves to step S1100 and repeats the processing of step S1100 and subsequent steps.

If, however, it is determined in step S1101 that the check of all the remote-copy groups is not complete, the remote-copy group monitoring program 2227 refers to the response time table 2214 to determine whether the response time (or processor unused wait time) of the MPPK 210 with ownership in the remote-copy group is equal to or more than the threshold (S1102).

If it is determined in step S1102 that the response time of the MPPK 210 is equal to or more than the threshold, the remote-copy group monitoring program 2227 reports to the user that the remote-copy group is to be excluded from the ownership migration objects (S1103) and then returns to step S1101 to execute the processing of steps S1102 and subsequent steps for the other remote-copy groups. If, on the other hand, it is determined in step S1102 that the response time of the MPPK 210 is not equal to or more than the threshold, the remote-copy group monitoring program 2227 returns to step S1101 and executes the processing of step S1102 and subsequent steps for the other remote-copy groups.

With the remote-copy group monitoring processing above, it is possible to search for remote-copy groups which are highly likely to exhibit a worsening of response in the migration-destination MPPK 210 when ownership is migrated and to present these remote-copy groups to the user.

(Ownership Migration Mode)

The ownership migration mode will be described next. Hereinabove, a method was described which detects variations in the load of the MPPK 210 and whereby the storage apparatus 200 determines the migration-destination MPPK, migration-source MPPK, or the ownership and the like to be migrated. However, when ownership is migrated, there is a migration processing overhead, and hence sometimes executing the migration processing at times when the load is low may be desirable. A case may also be considered where the user intentionally changes the migration-destination MPPK, migration-source MPPK, or the ownership to be migrated, which are determined by the storage apparatus. For example, in cases where the user is aware beforehand of the timing with which fluctuations in the processing load occur, there may be a desire to execute migration processing by avoiding such timing.

In order to meet user needs of this kind, in this embodiment, when ownership is migrated, three modes, namely, an automatic migration mode, a migration candidate presentation mode, and a bottleneck notification mode are provided. Automatic migration mode is a mode in which a migration object is determined by the storage apparatus 200 and migration processing is executed automatically. Migration candidate presentation mode is a mode in which a migration object is determined by the storage apparatus 200, information of MPPK and the like which are migration candidates is presented to the user, and the migration processing is executed in response to user inputs. Bottleneck notification mode is a mode in which load variations in the storage apparatus 200 are notified and the migration objects and timing for migration processing are determined in response to user inputs.

Figure 21:
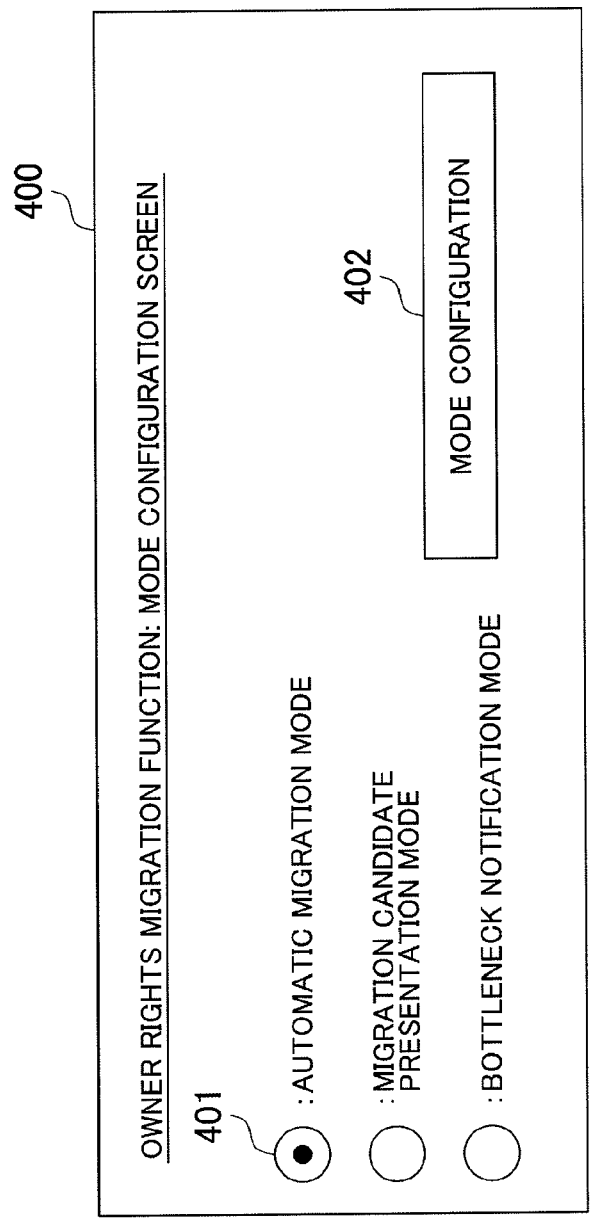
FIG. 21 is a conceptual view of a mode configuration screen according to this embodiment.

A mode configuration screen for configuring the foregoing three modes will first be explained. The mode configuration screen is an input screen which is displayed on a display screen of the I/O unit 274 of the service processor 270. As shown in FIG. 21, the mode configuration screen 400 includes radio buttons 401 enabling the selection of one of three modes, namely, the automatic migration mode, the migration candidate presentation mode, and the load variation notification mode, and a mode configuration button 402. The user first uses the radio buttons 401 to select one mode from the foregoing three modes and presses button 402. As a result of the user pushing button 402, the content of the mode configured by the user is reported to the storage apparatus 200.

Figure 22:
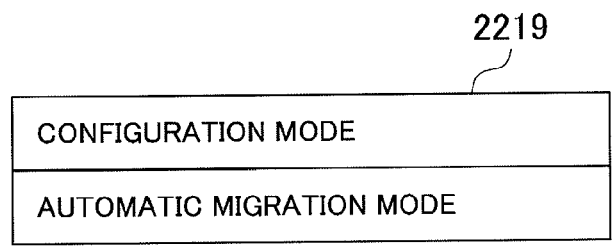
FIG. 22 is a diagram showing content of a configuration mode according to this embodiment.

The configuration modification program 2221 of the storage apparatus 200 updates the configuration mode 2219 stored in the control information unit 221 according to the mode configured by the user via the service processor 270. The configuration mode 2219 stored in the control information unit 221 stores all three of the foregoing modes. FIG. 22 shows a case where information indicating automatic migration mode is stored in the configuration mode 221.

Figure 23:
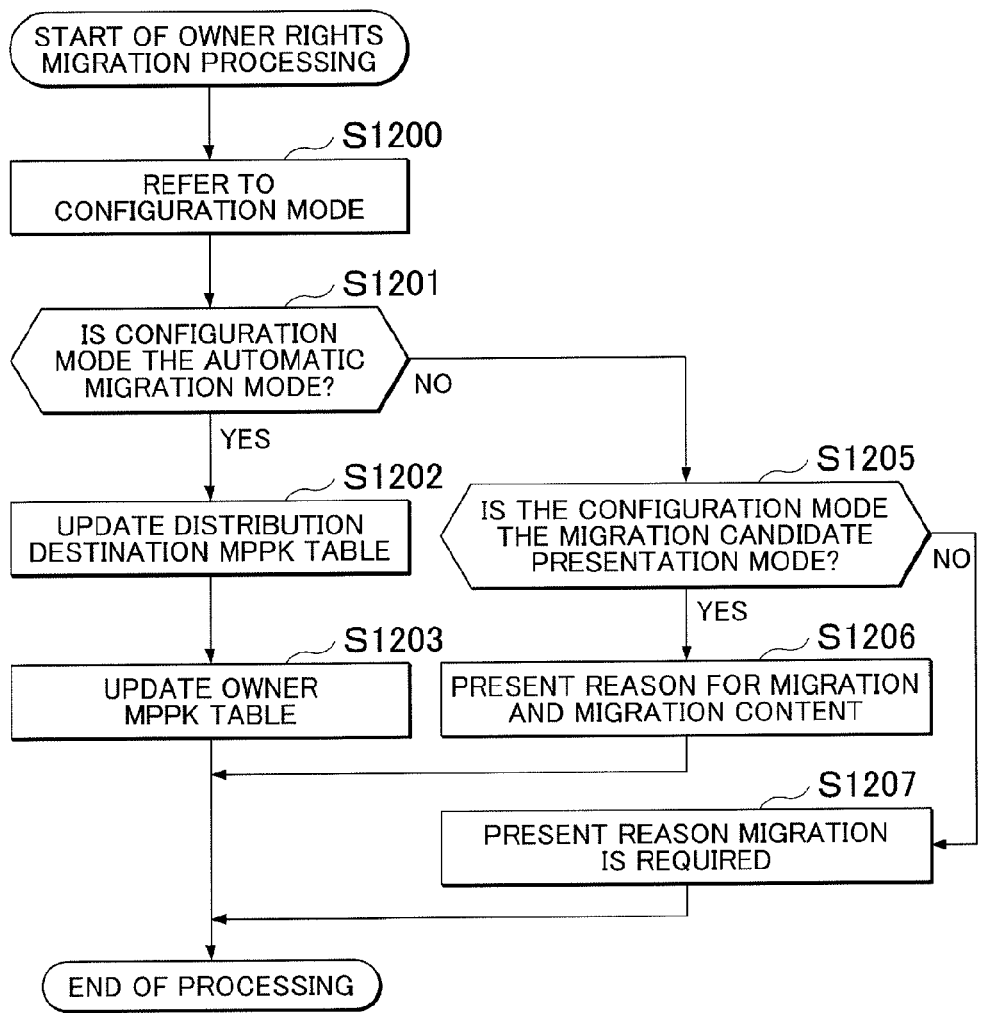
FIG. 23 is a flowchart showing processing content of ownership migration processing according to this embodiment.

Ownership migration processing for a case where the three modes are considered will be described next. As shown in FIG. 23, the ownership migration program 2223 refers to the configuration mode 2219 to acquire information on the configuration mode currently configured (S1200). The ownership migration program 2223 then determines whether the configuration mode acquired in step S1200 is automatic migration mode. (S1201).

If it is determined in step S1201 that the configuration mode is not automatic migration mode, the ownership migration program 2223 determines whether the configuration mode is migration candidate presentation mode (S1205). Meanwhile, if it is determined in step S1201 that the configuration mode is automatic migration mode, the ownership migration program 2223 executes the processing of step S1202 and subsequent steps.

If it is determined in step S1205 that the configuration mode is migration candidate presentation mode, the ownership migration program 2223 presents the reason for migration and migration details to the user (S1206), and terminates the processing. Here, the reason for migration is the reason for migrating ownership, examples of which include the occurrence of an MP bottleneck or load variations between the MPPK. Furthermore, the migration content is information indicating what kind of ownership is migrated from a particular MPPK to a particular MPPK.

If, however, it is determined in step S1205 that the configuration mode is not the migration candidate presentation mode, the ownership migration program 2223 presents the reason the ownership migration is required to the user (S1207) and terminates the processing. Here, examples of reasons why ownership migration is required include an MP bottleneck or a load variation between MPPK.

Further, if it is determined in step S1201 that the configuration mode is automatic migration mode, the ownership migration program 2223 updates the distribution destination MPPK table 263 (S1202) and updates the owner MPPK table 2211 (S1203) and terminates the processing.

(1-4) Effect of this Embodiment

As described hereinabove, in the storage system 1 according to this embodiment, variations in the MP utilization (processing load variations) between the plurality of MPPK 210 provided in the storage apparatus 200 are detected and the migration-source MPPK from which the ownership is migrated and the ownership migration-destination MPPK is selected on the basis of the variations in the MP utilization. Further, it is determined whether to migrate the ownership of the MPPK based on the usage status of the resources of the volume to which the migration-source MPPK possesses ownership, and the like, and it is determined whether ownership is migrated to the MPPK on the basis of information on the state of the I/O processing of the migration-destination MPPK and so on. Accordingly, reduced performance caused by ownership migration can be avoided and resource depletion caused by ownership migration can be eliminated, thus improving the usage efficiency of the MPPK.

(2) Second Embodiment (2-1) Configuration of Computer system

The hardware configuration of the computer system 2 according to this embodiment is the same as the hardware configuration of the computer system 1 according to the first embodiment and hence a detailed description thereof is not included. Furthermore, where the software configuration of the computer system 2 is concerned, the programs stored in the program unit 222 of the memory package 220 differ from those of the first embodiment and therefore details of the configuration differences from the first embodiment in particular will be described hereinbelow.

A method of avoiding reduced performance due to ownership migration as a result of limiting the migration object ownership, ownership migration source MPPK 210 or ownership migration destination MPPK 210 was described in the first embodiment. In this embodiment, the performance of the storage apparatus 200 is improved by migrating ownership by means of the following method.

(c-1) Method of selecting the optimum MPPK as the ownership migration object by considering the response time and resource usage rate and so on excluding MP utilization.

(c-2) Method of migrating ownership for eliminating resource depletion (c-3) Method of migrating ownership for enhancing response time variations This embodiment differs from the first embodiment in that a new program for implementing the foregoing three methods is added to the program unit 222. More specifically, as shown in FIG. 24, in this embodiment, the program unit 222 stores a second monitoring program 2228, an MP utilization equalization program 2229, a resource depletion elimination program 2230, and a response time improvement program 2231 in addition to the configuration modification program 2221, monitoring program 2222, ownership migration program 2223, first MPPK monitoring program 2224 (similar to the MPPK monitoring program 2224 of the first embodiment), the resource monitoring program 2225, the volume monitoring program 2226, and the remote-copy group monitoring program 2227.

(2-2) Functional Configuration of Storage Apparatus

The processing routine for implementing the foregoing methods (c-1), (c-2), and (c-3) will be described hereinbelow. The monitoring processing by the second monitoring program 2228 will be described first.

Figure 25:
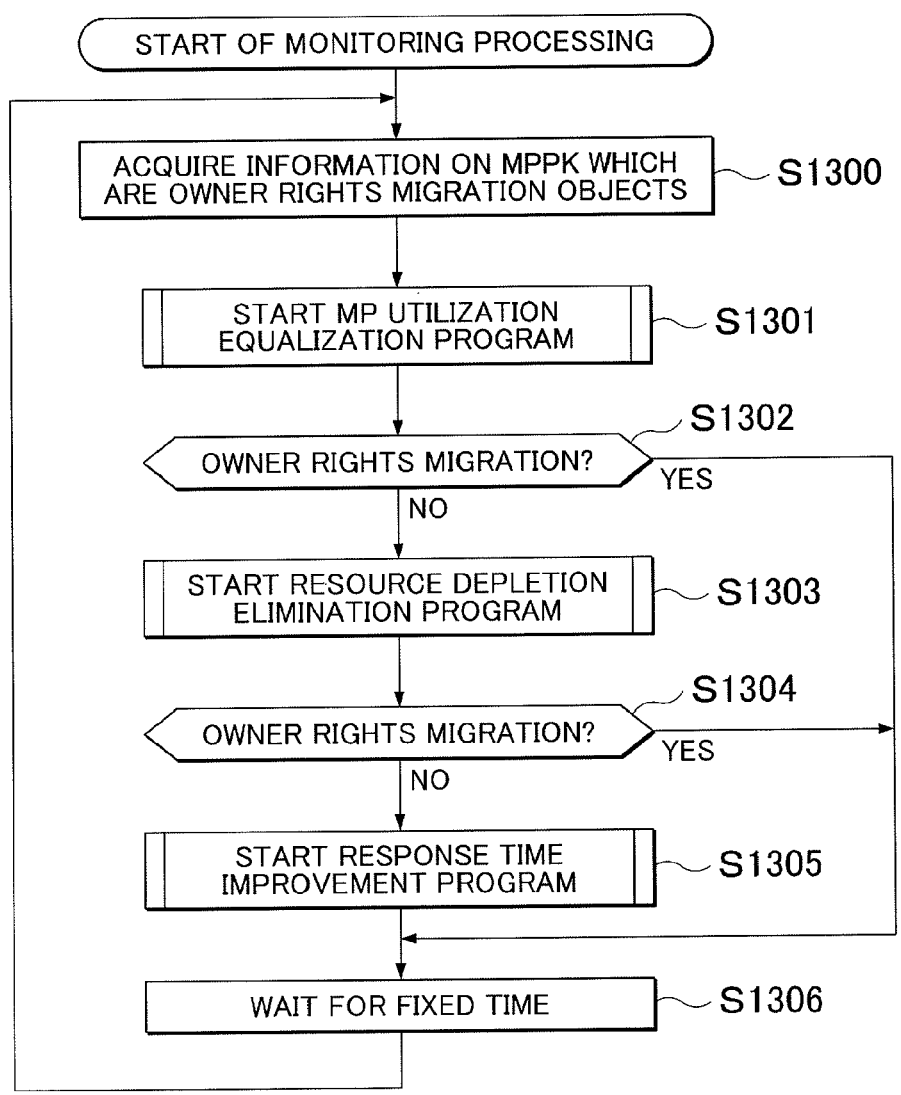
FIG. 25 is a flowchart showing processing content of monitoring processing according to this embodiment.

As shown in FIG. 25, the second monitoring program 2228 acquires information on the MPPK 210 which are the ownership migration objects (S1300). More specifically, the second monitoring program 2228 refers to the migration object table 2213, the MP utilization table 2212, the response time table 2214, the cache management table (MPPK) 2215, the resource management table 2217, and the resource depletion table 2218 to acquire the MP utilization, response time, resource usage rate and resource reservation failure count of the MPPK 210 which are the ownership migration objects.

In order to eliminate variations in the MP utilization, the monitoring program 2228 starts up the MP utilization equalization program 2229 (S1301). The MP utilization equalization processing by the MP utilization equalization program 2229 will be described in detail subsequently.

If ownership migration is executed as a result of executing the MP utilization equalization program 2229 in step S1301, the second monitoring program 2228 advances to step S1306 and, after a fixed time has elapsed, returns to step S1300 and repeats the processing of step S1300 and subsequent steps. If, however, ownership migration is not executed (S1302) due to the fact that there is no MP bottleneck or load variation between the MPPK in step S1301, the second monitoring program 2228 starts up the resource depletion elimination program 2230 (S1303). The resource depletion elimination processing by the resource depletion elimination program 2230 will be described in detail subsequently.

If ownership migration is executed as a result of executing the resource depletion elimination program 2230 in step S1303, the second monitoring program 2228 advances to step S1306 and, after a fixed period has elapsed, returns to step S1300 and repeats the processing of step S1300 and subsequent steps. However, if ownership migration is not executed since resource depletion has not occurred in S1303 (S1304), the second monitoring program 2228 starts up the response time improvement program 2231 (S1305).

After executing the response time improvement program 2231 in step S1305, the second monitoring program 2228 returns to step S1300 and repeats the processing of step S1300 and subsequent steps after a fixed time has elapsed (S1306).

Figure 26:
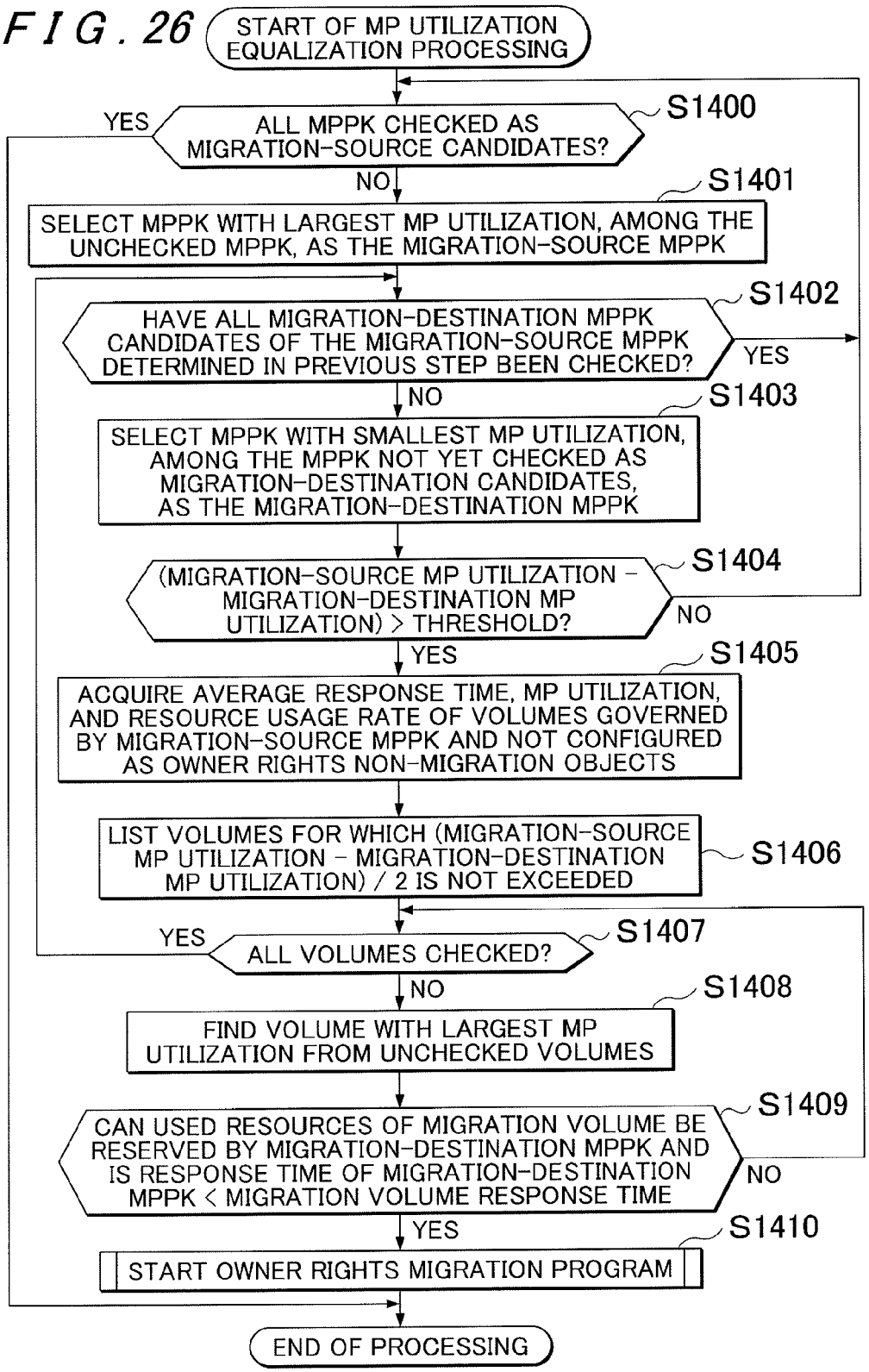
FIG. 26 is a flowchart showing processing content of MP utilization equalization monitoring processing according to this embodiment.

(c-1) Method for Selecting the Optimum MPPK as Ownership Migration Object by Considering the Response Time and Resource Usage Rate Excluding the MP Utilization The MP utilization equalization processing which is executed in step S1301 above will be described next. The MP utilization equalization processing is processing for determining the ownership migration destination by considering the response time and resource usage rate. As shown in FIG. 26, the MP utilization equalization program 2229 first determines whether all the MPPK which are ownership migration objects have been checked as migration source candidates (S1400). If it is determined in step S1400 that not all the migration-source candidate MPPK have been checked, the MP utilization equalization program 2229 renders the MPPK with the largest MP utilization, among the unchecked MPPK, the migration-source MPPK (S1401). Meanwhile, if it is determined in step S1400 that all the MPPK which are migration source candidates have been checked, the MP utilization equalization program 2229 terminates the processing.

The MP utilization equalization program 2229 then determines whether all the migration-destination MPPK candidates of the MPPK rendered migration-source candidates in step S1401 have been checked (S1402) and if all have been checked, returns to the processing of step S1400. If, however, it is determined in step S1402 that not all the migration-destination MPPK candidates have been checked, the MP utilization equalization program 2229 renders the MPPK with the smallest MP utilization, among the unchecked MPPK of the migration-destination candidate MPPK, the migration-destination MPPK (S1403).

The MP utilization equalization program 2229 then determines whether the MP utilization of the MPPK rendered the migration-source MPPK in step S1401 and the MP utilization of the migration-destination MPPK rendered the migration-destination MPPK in step S1403 satisfy the following equation (S1404). Migration-source MP utilization−migration-destination MP utilization> threshold (2)

Furthermore, if equation (2) is not satisfied in step S1404, there is no need to migrate the ownership and hence the MP utilization equalization program 2229 returns to step S1400 and repeats the processing of step S1400 and subsequent steps. If, however, it is determined in step S1404 that equation (2) is satisfied, the load can be equalized by migrating ownership from the migration-source MPPK to the migration-destination MPPK and the MP utilization equalization program 2229 therefore executes the processing of step S1405 and subsequent steps.

In step S1405, the MP utilization equalization program 2229 acquires the average response time, the MP utilization, and the resource usage rate of volumes governed by the migration-source MPPK and not configured as ownership non-migration objects (S1405). More specifically, the MP utilization equalization program 2229 refers to the migration object table 2213, the owner MPPK table 2211, the MP utilization table 2212, the response time table 2214, the cache management table (volume) 2216, and the resource management table 2217 to acquire information of volumes to which the migration-source MPPK possesses ownership and which are ownership migration objects.

The MP utilization equalization program 2229 subsequently makes up a list of volumes for which the MP utilization is equal to or less than (the MP utilization of the migration-source MPPK−the MP utilization of the migration-destination MPPK)/2 (S1406).

The MP utilization equalization program 2229 then determines whether the volumes listed in step S1406 have been checked (S1407). Subsequently, if it is determined in step S1407 that not all the volumes have been checked, the MP utilization equalization program 2229 searches for volumes with the largest resource usage rate from the unchecked volumes (S1408).

The MP utilization equalization program 2229 then checks whether the resources used by the volumes sought in step S1408 can be reserved by the migration-destination MPPK (S1409). More specifically, the MP utilization equalization program 2229 determines whether the resources used by the migration volumes can be reserved by the migration-destination MPPK and whether the response time of the migration volume is greater than the response time of the migration-destination MPPK. It is possible to determine whether resource depletion has occurred in the migration-destination MPPK by referring to the resource management table 2217 and cache management table (volume) 2216 to confirm the resource usage rate of the migration volume and the resource usage rate of the migration-destination MPPK. It is also possible to determine whether the response time of the migrated volume in the migration-destination MPPK has worsened by referring to the response time table 2214 to confirm the response time of the migration volume and the response time of the migration-destination MPPK. Here, the response time is considered to have not worsened if the response time of the migration-destination MPPK is smaller than the response time of the volume being migrated. Although this determination is made hereinabove by using the response time of the migration-destination MPPK prior to executing the ownership migration, the determination may also be made by using the response time of the migration-destination MPPK after executing the ownership migration. This can be computed by calculating the MP utilization of the migration-destination MPPK after the ownership is migrated from the MP utilization of the volume being migrated and using the queuing model. Further, it may also be determined that the response is not impaired even when ownership migration is performed in cases where the difference between the response time of the migration-destination MPPK and the response time of the migration volume is no more than a fixed value. The processing in step S1409 makes it possible to determine whether or not resource depletion has occurred in the migration destination MPPK after the volume is migrated. A condition that a remote copy group not be configured in the migration-destination MPPK may be also added to the conditions for migrating ownership of step S1409. Furthermore, the condition of step S1409 may simply be that a remote copy group is not configured at the migration-destination MPPK.

Furthermore, if it is determined in step S1409 that resources used by the migration volume in the migration-destination MPPK can be reserved, the MP utilization equalization program 2229 starts the ownership migration program 2223 (S1410) and terminates the processing.

If, however, it is determined in step S1409 that the resources used by the migration volume in the migration-destination MPPK cannot be reserved, the MP utilization equalization program 2229 returns to the processing of step S1407 and repeats the processing of step S1407 and subsequent steps by targeting the volume with the next largest MP utilization. If none of the volumes satisfy the conditions of step S1409, the MP utilization equalization program 2229 returns to step S1402 and repeats the processing of step S1402 and subsequent steps by taking the MPPK with the next lowest MP utilization as the migration-destination MPPK.

As a result of the foregoing MP utilization equalization processing, ownership migration to an MPPK whose response time has worsened and ownership migration to MPPK with depleted resources can be avoided.

(c-2) Ownership Migration Method for Eliminating Resource Depletion.

Figure 27:
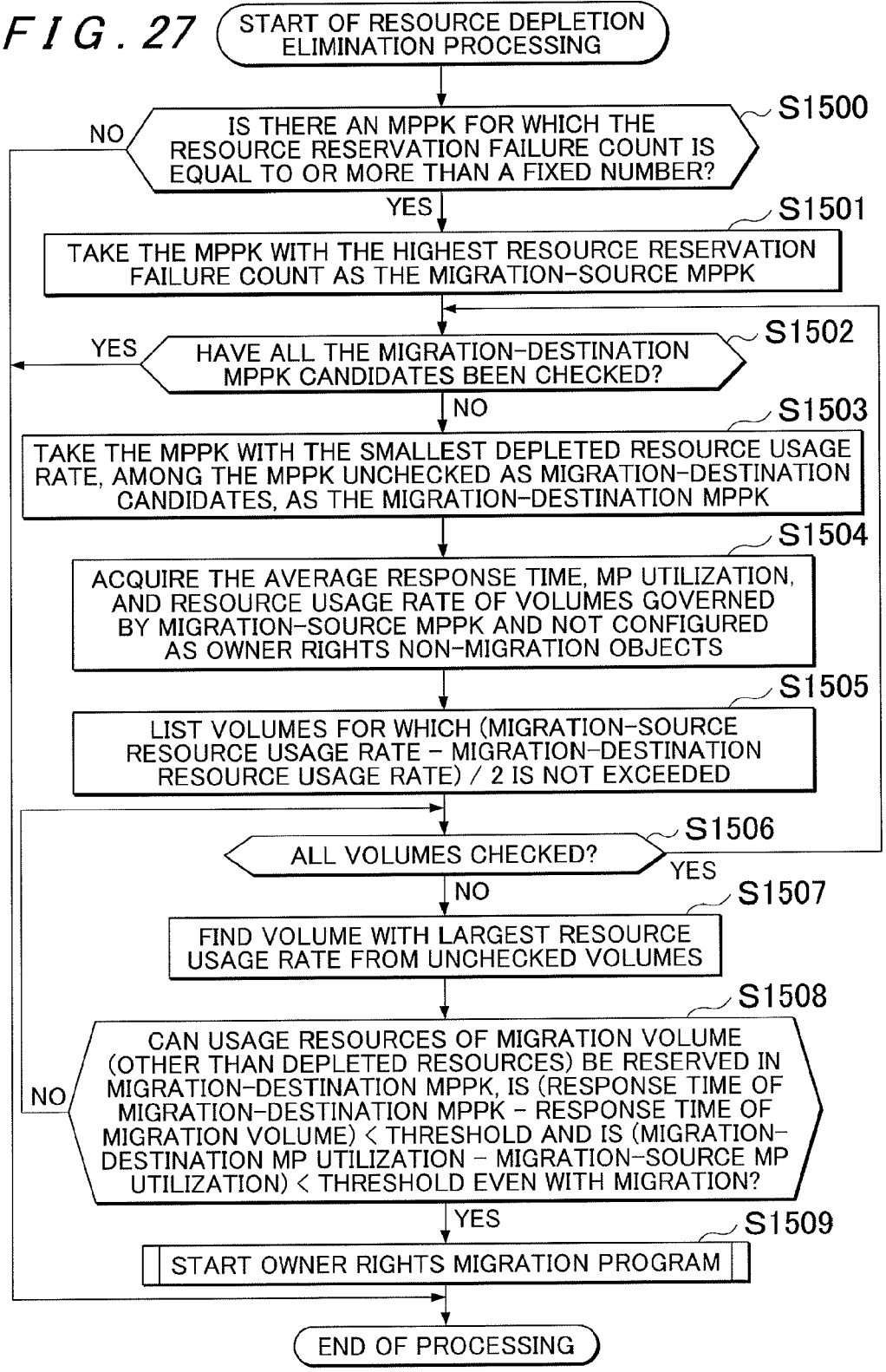
FIG. 27 is a flowchart showing processing content of resource depletion elimination processing according to this embodiment.

Resource depletion elimination processing which is executed in foregoing step S1303 will be described next. The resource depletion elimination processing is processing for eliminating resource depletion by migrating ownership from the MPPK in which resource depletion occurs. As shown in FIG. 27, the resource depletion elimination program 2230 first determines whether there is an MPPK for which the resource reservation failure count is equal to or more than a fixed number or more (S1500). The MPPK with the greatest resource reservation failure count is taken as the migration-source MPPK (S1501). If the resource reservation failure count is equal to or less than a fixed number in step S1500, the resource depletion elimination program 2230 terminates the processing.

The resource depletion elimination program 2230 subsequently determines whether all the MPPK which are ownership migration objects have been checked (S1502) and, if all have been checked, returns to the processing of step S1500. If, however, it is determined in step S1502 that not all the MPPK which are ownership migration objects have been checked, the resource depletion elimination program 2230 specifies the MPPK with the smallest depleted resource usage rate, among the MPPK which have not been checked as migration-destination candidates, and takes this MPPK as the migration-destination MPPK (S1503).

The resource depletion elimination program 2230 then acquires the average response time, MP utilization, and resource usage rate of volumes which are governed by the migration-source MPPK configured in step S1501 and not configured as ownership non-migration objects (S1504).

The resource depletion elimination program 2230 subsequently makes up a list of volumes for which the resource usage rate is equal to or less than (the resource usage rate of the migration-source MPPK−the resource usage rate of the migration-destination MPPK) by targeting resources which are depleted in the migration-source MPPK (S1505).

The resource depletion elimination program 2230 then determines whether the volumes listed in step S1505 have been checked (S1506). Subsequently, if it is determined in step S1506 that not all the volumes have been checked, the resource depletion elimination program 2230 searches for the volume with the largest resource usage rate from the unchecked volumes (S1507).

The resource depletion elimination program 2230 then checks whether the resources used by the volume sought in step S1507 (resources other than resources depleted in the migration-source MPPK) can be reserved by the migration-destination MPPK, whether the response time of this volume does not worsen in the migration-destination MPPK, and whether a value, obtained by subtracting the MP utilization of the migration-source MPPK from the MP utilization of the migration-destination MPPK, is less than a predetermined threshold also after the volume is migrated to the migration-destination MPPK (S1508).

This checking of the resources and response in step S1508 is not described in detail here since the processing is the same as that in the foregoing step S1409. Furthermore, the checking of the MP utilization in step S1508 can also be confirmed based on the MP utilization of the migration-source MPPK, the MP utilization of the migration-destination MPPK, and the MP utilization of the migrated volume by referring to the MP utilization table 2212. Note that the conditions for comparing the MP utilization in step S1508 may be modified so that, after ownership migration, the MP utilization of the migration-destination MPPK is equal to or less than the MP utilization of the migration-source MPPK. In this case, inversion of the relationship between the MP utilization of the migration-source MPPK and the MP utilization of the migration-destination MPPK can be prevented by the ownership migration. It is accordingly possible to reliably prevent a condition where ownership migration between two MPPK is repeated.

By executing the processing of the foregoing steps S1506 to S1508, it is possible to search for volumes, among the volumes listed in step S1505, for which the response time has worsened despite migration to the migration-destination MPPK, for which resources excluding the resources depleted at the migration source are depleted, and for which the MP utilization of the migration-destination MPPK has not greatly worsened.

If the conditions are fulfilled in step S1508, the resource depletion elimination program 2230 starts the ownership migration program 2223 (S1509) and terminates the processing. If, however, the conditions are not fulfilled in step S1508, the resource depletion elimination program 2230 returns to step S1506 and repeats the processing of step S1506 and subsequent steps by targeting the volume with the next largest usage rate of depleted resources.

Further, if the conditions of step S1508 are not fulfilled for any of the volumes, the resource depletion elimination program 2230 returns to step S1502 and repeats the processing of step S1502 and subsequent steps by taking the MPPK with the next smallest depleted resource usage rate as the migration-destination MPPK.

As a result of the foregoing resource depletion elimination processing, ownership can be migrated from an MPPK in which resource depletion occurs to another MPPK to eliminate resource depletion and improve performance. Furthermore, resource depletion in the ownership migration destination MPPK and an extreme worsening of the MP utilization of the migration-destination MPPK can also be prevented.

(c-3) Ownership Migration Method for Improving Response Time Variations.

Figure 28:
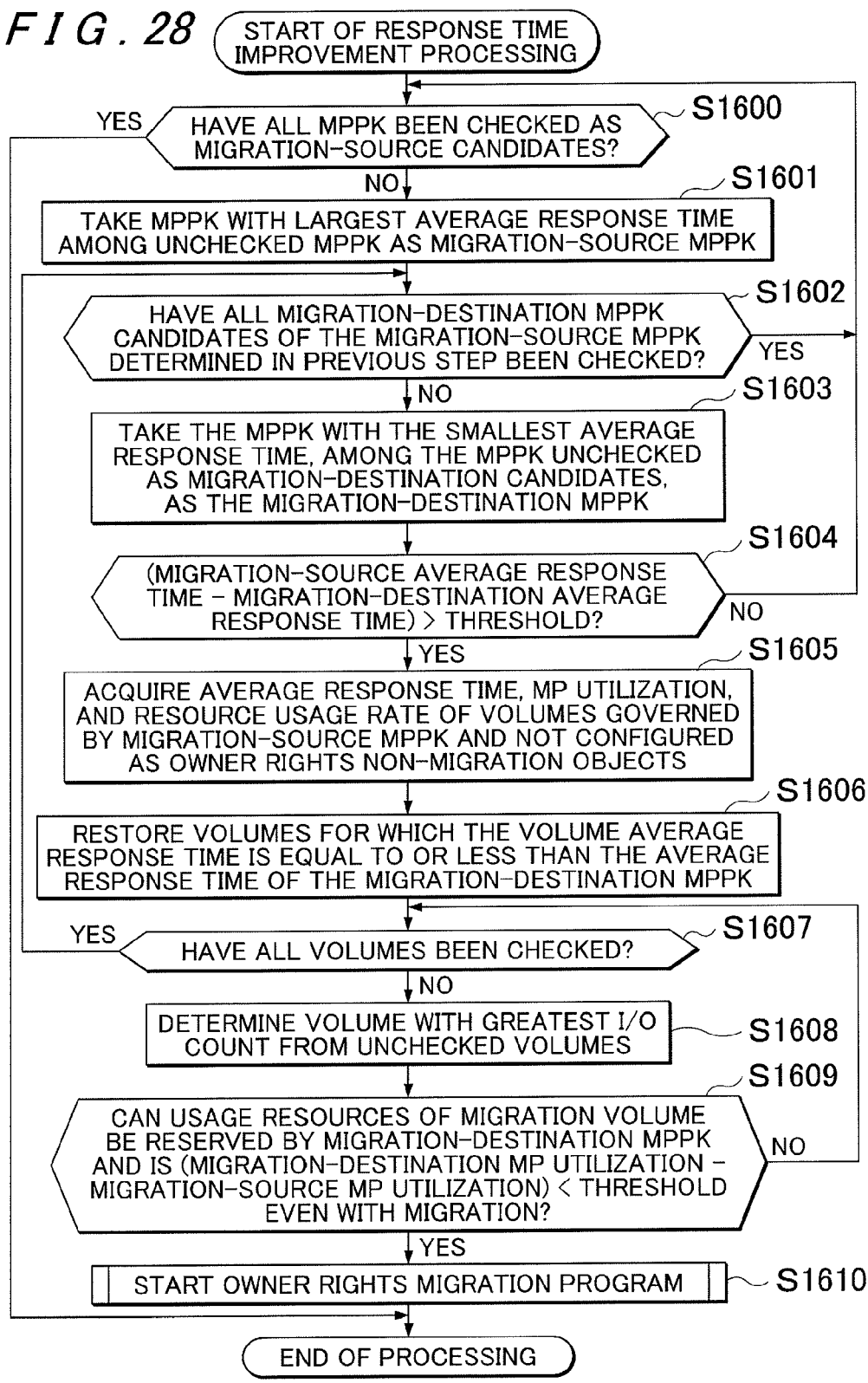
FIG. 28 is a flowchart showing processing content of response time improvement processing according to this embodiment.

Response time improvement processing which is executed in the foregoing step S1305 will be described next. The response time improvement processing is processing which eliminates response variations arising between MPPK through the migration of ownership. As shown in FIG. 28, the response time improvement program 2231 first determines whether all the MPPK which are ownership migration objects have been checked as migration source candidates (S1600). If it is determined in step S1600 that not all the MPPK which are migration source candidates have been checked, the response time improvement program 2231 takes the MPPK with the largest average response time, among the MPPK not yet checked, as the migration-source MPPK (S1601). If, however, it is determined in step S1600, that all the MPPK which are migration-source candidates have been checked, the response time improvement program 2231 terminates the processing.

The response time improvement program 2231 subsequently determines whether all the migration-destination MPPK candidates for the migration-source MPPK determined in step S1601 have been checked and takes the MPPK with the smallest average response time, among the migration-destination MPPK candidates which have not yet been checked, as the migration-destination MPPK (S1602).

The response time improvement program 2231 subsequently determines whether the average response time of the migration-destination MPPK which is determined in step S1603 and the average response time of the migration-source MPPK determined in step S1601 fulfill the following equation (S1604).

$$\text{Migration-source average response time} - \text{migration-destination average response time} > \text{threshold} \quad (3)$$

Further, if equation (3) is not satisfied in step S1604, there is no need to migrate the ownership and hence the response time improvement program 2231 returns to step S1600 and repeats the processing of step S1600 and subsequent steps. If, however, it is determined in step S1604 that equation (3) is fulfilled, the response time can be improved by migrating ownership from the migration-source MPPK to the migration-destination MPPK, and hence the response time improvement program 2231 executes the processing of step S1605 and subsequent steps.

In step S1605, the response time improvement program 2231 acquires information on volumes which are governed by the migration-source MPPK and which are ownership migration objects (S1405). More specifically, the response time improvement program 2231 refers to the migration object table 2213, the owner MPPK table 2211, the MP utilization table 2212, the owner MPPK table 2212, the response time table 2214, the cache management table (volume) 2216, and the volume management table 2217 and acquires information on volumes to which the migration-source MPPK possesses ownership and which are ownership migration objects.

The response time improvement program 2231 then restores volumes for which the volume response time is equal to or less than the average response time of the migration-destination MPPK (S1606). The objective in step S1606 is to select a volume for which the average response time of the migration-destination MPPK does not worsen even when the ownership are migrated. Stricter computation is therefore also possible. For example, the average value for the time the processor is continuously occupied by processing of the volumes may be newly managed and the average response time of the migration-destination MPPK after volume ownership migration may be computed by means of the queuing model by using the processor occupancy time and MP utilization.

The response time improvement program 2231 subsequently determines whether the volumes listed in step S1606 have been checked (S1607). Further, if it is determined in step S1607 that not all the volumes have been checked, the response time improvement program 2231 searches for the volume with the largest I/O count from the unchecked volumes (S1608). Here, the I/O counts of the volumes used in step S1608 are managed by the I/O count table 2220. The I/O count table 2220 will be described in detail subsequently.

The response time improvement program 2231 subsequently checks whether the resources used by the volume sought in step S1608 can be reserved by the migration-destination MPPK and whether a value, obtained by subtracting the MP utilization of the migration-source MPPK from the MP utilization of the migration-destination MPPK, is less than a predetermined threshold also after the volume is migrated to the migration-destination MPPK (S1609). The checking processing in step S1609 is the same as that of the foregoing step S1409 or step S1508 and hence a detailed description thereof is not included.

If the conditions are fulfilled in step S1609, the response time improvement program 2231 starts the ownership migration program 2223 (S1610) and terminates the processing. If, however, the conditions are not fulfilled in step S1609, the response time improvement program 2231 returns to step S1607 and repeats the processing of step S1607 and subsequent steps by targeting the volume with the next largest I/O count.

Further, if the conditions of step S1609 are not fulfilled for any of the volumes, the response time improvement program 2231 returns to step S1602 and repeats the processing of step S1602 and subsequent steps by taking the MPPK with the next smallest average response as the migration-destination MPPK.

As a result of the foregoing response improvement processing, ownership can be migrated from an MPPK whose response time has worsened to another MPPK to make it possible to eliminate response time variations and improve performance.

The I/O count table which is used in the foregoing step S1608 will be described next. As shown in FIG. 29, the I/O count table 2240 is configured from a volume number field 2240a and an I/O count field 2240b. The volume number field 2240a stores numbers for uniquely identifying the volumes 250 in the storage apparatus 200. Furthermore, the I/O count field 2240b stores the numbers of I/O per unit of time which are issued to each of the volumes 250. In FIG. 29, read requests and write requests are counted indiscriminately but read and write requests may also be counted separately.

(2-3) Effect of the Embodiment

As described hereinabove, in the computer system 2 according to this embodiment, the optimum MPPK is selected as the ownership migration object by considering information on the response time and resource usage rate excluding the MP utilization, the resource depletion status, and the response time variations. As a result, the ownership can be migrated to improve the performance of the storage apparatus 200 migrating the ownership.

(3) Third Embodiment (3-1) Configuration of Computer System

Where the hardware configuration of the computer system 3 according to this embodiment concerned, the hardware configuration of the computer system 3 according to the first embodiment is the same as the hardware configuration of the computer system 1 according to the first embodiment and hence a detailed description thereof is not included. Furthermore, where the software configuration of the computer system 3 is concerned, the programs and tables stored in the memory package 220 differ from those of the first embodiment and therefore details of the configuration differences from the first embodiment in particular will be described hereinbelow.

In this embodiment, ownership migration between specific MPPK is enabled. For example, a case has been described where four MPPK 210 are contained in the storage apparatus. The four MPPK 210 are MPPK0, MPPK1, MPPK2, and MPPK3. Here, ownership migration is permitted between the MPPK0 and MPPK1 and ownership migration is allowed between MPPK2 and MPPK3, but ownership migration between the MPPK beyond these combinations is prevented. By means of such configuration, whereby ownership migration is allowed between specific MPPK, for example in a configuration in which the MPPK0 and MPPK1 are used in certain task processing and MPPK2 and MPPK3 are used for other task processing, it is possible to meet a demand to execute load distribution by migrating ownership, or similar, but avoid migration which would lead to adverse effects from other task processing.

The range in which ownership migration is allowed will be described hereinbelow as partition 1. Furthermore, hereinafter it is assumed that MPPK0 and MPPK1 belong to partition 1, while MPPK2 and MPPK3 belong to partition 2. In addition, a function for realizing ownership migration in a specific range will be described hereinbelow as the partition function.

(3-2) Functional Configuration of Storage Apparatus

In order to realize the partition function according to this embodiment, a partition table 2220 is added to the control information unit 221 of the memory package 220 and a third monitoring program 2232 is newly added to the program unit 222.

A partition table 2241 will be described first. The partition table 2241 is a table for managing which partition an MPPK 210 belongs to. As shown in FIG. 30, the partition table 2241 is configured from an MPPK number field 2241a and a partition number field 2241b. The MPPK number field 2241a stores numbers for uniquely identifying MPPK in the storage apparatus 200. The partition number field 2241b stores the partition numbers to which the MPPK 210 identified by the MPPK number belong. For example, FIG. 30 shows that MPPK 0 and MPPK 1 belong to partition 0 and MPPK 2 and MPPK 3 belong to partition 1.

Figure 31:
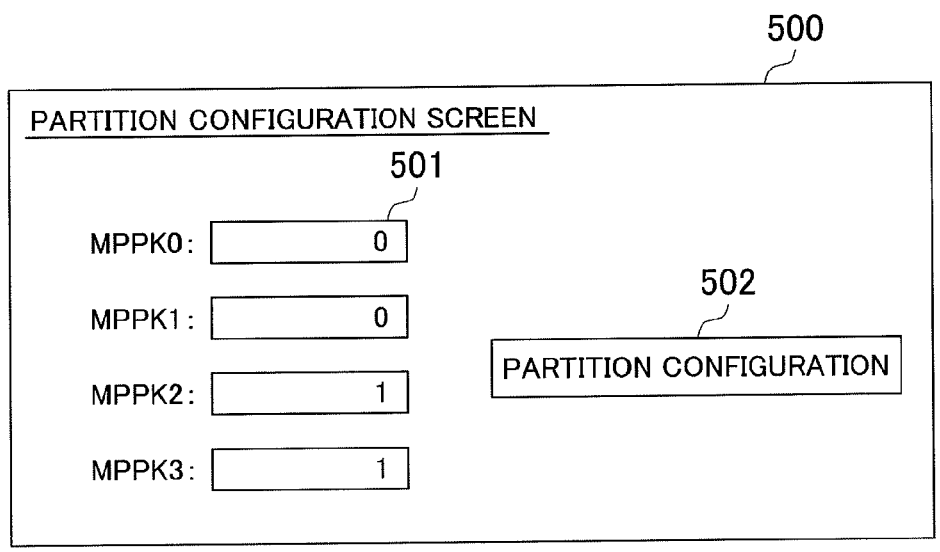
FIG. 31 is a conceptual view of a partition configuration screen according to this embodiment.

An input screen for configuring the partitions to which the MPPK belong will be described next. The input screen is an input screen which is displayed on the display screen of the I/O unit 274 of the service processor 270. As shown in FIG. 31, a partition configuration screen 500 is output to the I/O unit 274 of the service processor 270.

The partition configuration screen 500 is a screen for configuring the partitions to which the MPPK 210 belong. A partition number is input to a text box 501 which is disposed in each MPPK in response to a user input. When the partition configuration button 502 is pressed after the partition number is input, the configuration content is notified to the storage apparatus 200.

Upon receiving the partition configuration content input via the partition configuration screen from the service processor 270, the storage apparatus 200 starts the configuration modification program unit 2221 stored in the program unit 222 in the memory package 220 and updates the foregoing partition table 500.

Processing to select the migration-source MPPK and the migration-destination MPPK in consideration of the partition configuration status when ownership are migrated will be described next. The third monitoring program 2232 is a monitoring program which corresponds to the partition function. The monitoring program 2222 of the first embodiment differs in that it is determined whether or not the partitions to the migration-source MPPK and migration-destination MPPK belong are the same.

Figure 32:
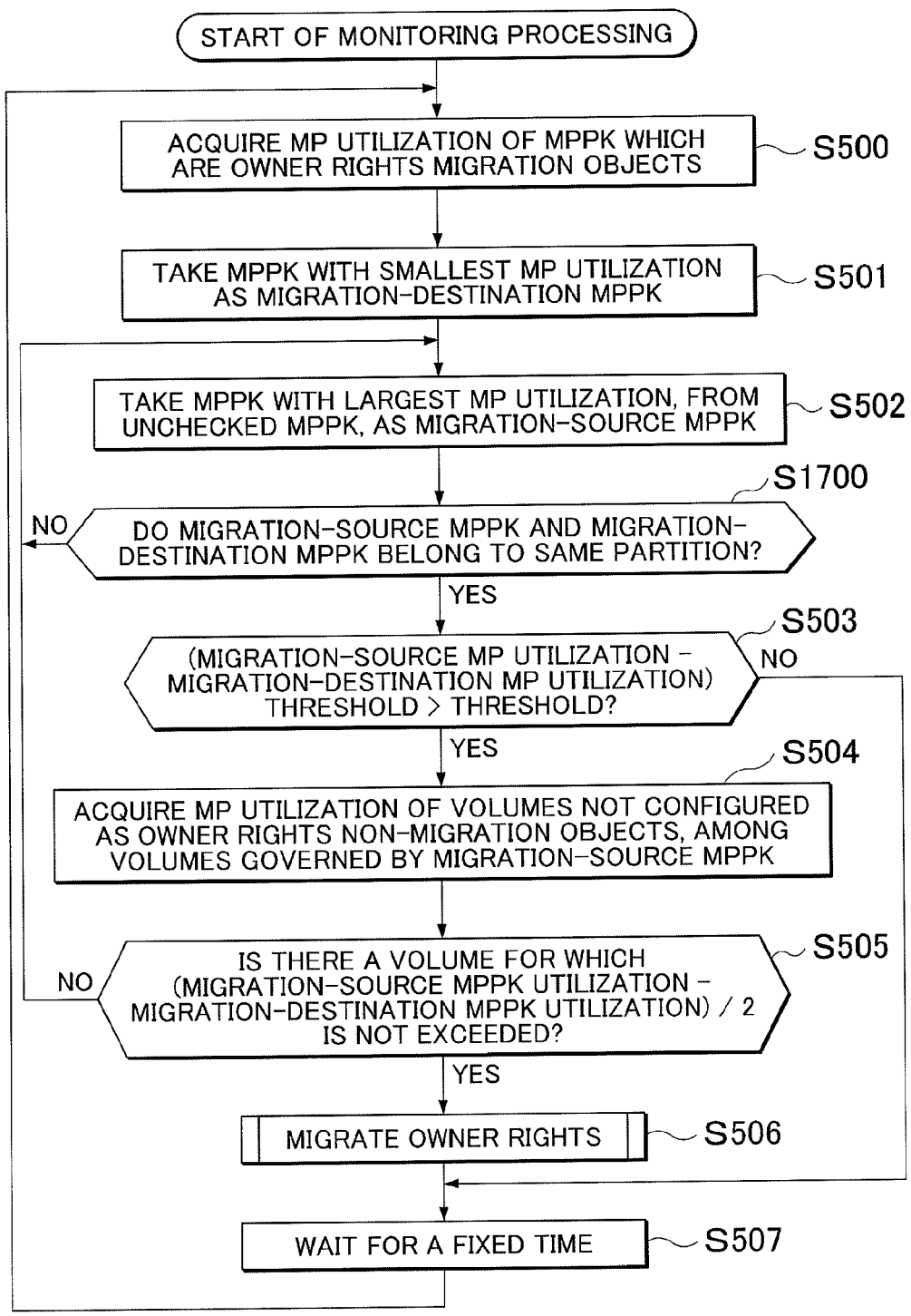
FIG. 32 is a flowchart showing processing content of monitoring processing according to this embodiment.

As shown in FIG. 32, the third monitoring program 2232 executes the processing of steps S500 to S502 to determine the ownership migration-source MPPK and migration-destination MPPK and then ascertain whether both MPPK belong to the same partition (S1700). More specifically, the third monitoring program 2232 refers to the partition table 2220 to compare the partition numbers to which the MPPK belong and determine whether both MPPK belong to the same partition.

If it is determined in step S1700 that both MPPK belong to the same partition, the third monitoring program 2232 executes the processing of step S503 and subsequent steps. If, however, it is determined in step S1700 that both MPPK do not belong to the same partition, the third monitoring program 2232 returns to step S502 and executes the processing of step S1700 and subsequent steps by taking another MPPK as a migration-source MPPK candidate.

Furthermore, the partition function can be realized by adding processing to compare the partitions to which the migration-source MPPK and migration-destination MPPK belong to the MP utilization equalization processing, resource depletion elimination processing, and response improvement processing according to the second embodiment.

For example, in the MP utilization equalization processing shown in FIG. 26, processing to compare the partitions to which the migration-source MPPK and migration-destination MPPK belong is added between the processing of step S1403 and processing of step S1404. If both MPPK do not belong to the same partition, [the third monitoring program 2232] returns to step S1402.

Further, in the resource depletion elimination processing shown in FIG. 27, processing to compare partitions to which the migration-source MPPK and the migration-destination MPPK belong is added between the processing of step S1503 and the processing of step S1504. If both MPPK do not belong to the same partition, the third monitoring program 2232 returns to step S1502.

In addition, in the response time improvement processing shown in FIG. 28, processing to compare partitions to which the migration-source MPPK and migration-destination MPPK belong is added between the processing of step S1603 and the processing of step S1604. Further, if both MPPK do not belong to the same partition, the third monitoring program 2232 then returns to step S1602.

(3-3) Effect of the Embodiment

By selecting the migration-source MPPK and migration-destination MPPK by comparing the partitions to which the migration-source MPPK and migration-destination MPPK belong as described hereinabove, the range for migrating ownership can be limited to extending between specific MPPK.

(4) Further Embodiments

Processing in which load variations and the like between MPPK are detected and ownership is migrated was described hereinabove. However, a case where, upon migration of ownership, MPPK 210 are added to the storage apparatus 200 may also be considered. If the storage apparatus 200 is provided with additional MPPK 210, the MP utilization of the added MPPK 210 is 0%. Hence, even if ownership to the MPPK with the largest MP utilization are migrated from an existing MPPK 210, in most cases the MP utilization of the added MPPK will be smaller than the MP utilization of the other MPPK. In this case, in order to equalize the MP utilization of the existing MPPK and the added MPPK, the MP utilization equalization processing shown in FIG. 26 must also be executed many times and takes time.

If, therefore, variations arise in the MP utilization due to the additional MPPK, the loads of the existing MPPK and added MPPK can be rapidly equalized by collectively migrating a plurality of ownership to the added MPPK.

Service processing which, in cases where MPPK are added, determines which ownership is migrated to which MPPK will be described hereinbelow. The service program 2232 for executing the service processing is stored in the program unit 222 of the memory package 220.

Figure 33:
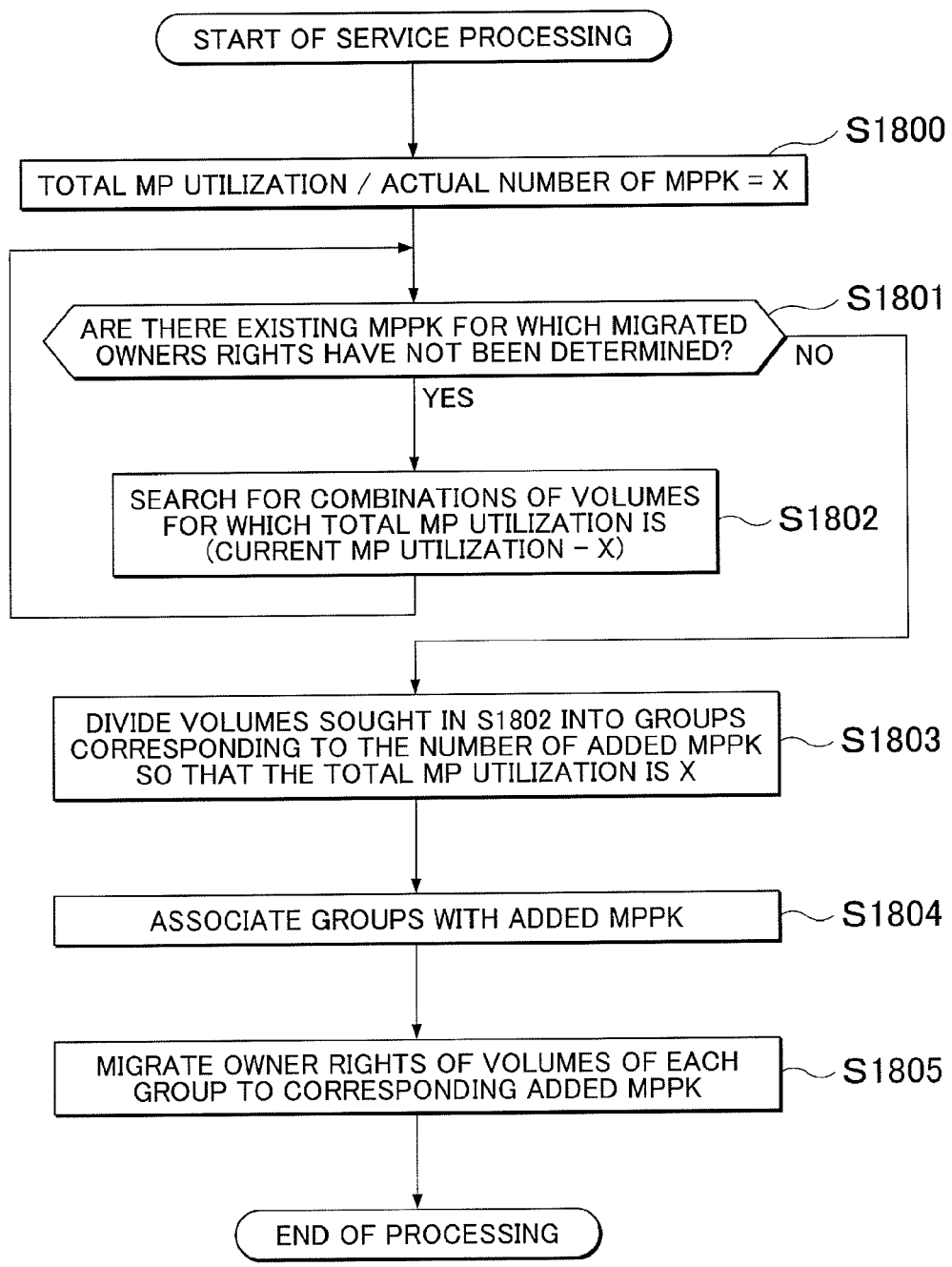
FIG. 33 is a flowchart showing processing content of service processing according to another embodiment.

As shown in FIG. 33, the service program 2232 first calculates the MP utilization X of each MPPK after equalizing the MPPK load (S1800). More specifically, the service program 2232 calculates the MP utilization X by means of the following equation (4).

$$X = \text{total MP utilization/number of actual MPPK} \quad (4)$$

Note that the number of actual MPPK is a number which includes the added MPPK.

The service program 2232 subsequently determines whether there are existing MPPK for which the migrated ownership have not been determined (S1801) and, if there are MPPK for which migrated ownership have not been determined, a search is conducted for combinations of volumes for which the total MP utilization of the volumes is (current MP utilization−X) (S1802). As a result of the processing of steps S1801 and S1802, ownership which is migrated from the MPPK to the added MPPK can be determined for each MPPK. In addition, by determining whether there are existing MPPK for which the processing of step S1802 has not been executed in step S1801, the processing of step S1802 can be executed for all the existing MPPK. Furthermore, after executing the processing of step S1802 on the existing MPPK, the service program 2232 executes the processing of step S1803 and subsequent steps.

The service program 2232 divides the plurality of volumes determined in step S1802 into groups corresponding to the number of added MPPK so that the total MP utilization of the volumes is MP utilization X, which is calculated using equation (4) above (S1803). More specifically, if two MPPK are added, the service program 2232 makes a list, from the existing MPPK, of the volumes for which the total of the volume utilization is MP utilization X*2. These volumes are then divided into sets of two volumes for which the MP utilization of the volumes is MP utilization X.

The service program 2232 subsequently associates the MPPK provided in each of the groups divided in step S1803 (S1804). The service program 2232 then migrates ownership for the volumes in the groups to the corresponding added MPPK (S1805) and terminates the processing.

Furthermore, although cases were described in the foregoing embodiments in which a microprocessor is applied as a control unit for controlling the whole of the processing relating to the various functions of the embodiments, the present invention is not limited to such cases, rather, hardware and software for executing the processing of this control unit may also be provided separately from the microprocessor. The same effects as for the foregoing embodiments can also be obtained in this way.

INDUSTRIAL APPLICABILITY

The present invention can be applied to a storage apparatus and a load distribution method for performing data I/O processing by means of a plurality of microprocessors.

REFERENCE SIGNS LIST

1, 2, 3 Computer system
100 Host apparatus
110 Network
200 Storage apparatus
211 Processor
212 Local memory
213 Service port
220 Memory package
221 Control information unit
222 Program unit
223 Cache unit
230 Backend package
240 Hard disk drive
250 Volume
260 Package
260 Frontend package
270 Service processor

The invention claimed is:

1. A storage apparatus which is connected via a network to a host apparatus which requests data I/Os, the storage apparatus comprising:
a plurality of microprocessors;
a plurality of storage areas formed in a drive group configured from a plurality of physical drives; and
a management unit which manages, as the microprocessors which possess ownership to the storage areas, the microprocessors which handle data I/Os to/from one or more storage areas among the plurality of storage areas,
wherein the management unit
detects variations in the processing loads of the plurality of microprocessors,
selects a migration-source microprocessor which migrates the ownership and a migration-destination microprocessor which is the ownership migration destination on the basis of variations in the processing load,
determines whether to migrate the ownership on the basis of information on a usage status of resources of each of the storage areas to which the migration-source microprocessor possesses ownership, and
each microprocessor manages a cache dirty ratio, and the microprocessor with the largest cache dirty ratio is configured as a non-migration destination target microprocessor.

2. The storage apparatus according to claim 1,
wherein, as information on the usage status of the resources of each of the storage areas, the management unit uses information on the processing load of each of the storage areas of the microprocessor which possesses the ownership to the storage areas, information on the cache usage rate of each of the storage areas or information on the response time of each of the storage areas.

3. The storage apparatus according to claim 1, wherein the management unit uses, as information on the usage status of the resources of each of the storage areas, information on the average response time of the storage areas belonging to remote-copy groups.

4. The storage apparatus according to claim 1, wherein the management unit determines whether to migrate the ownership on the basis of information on the state of the migration-destination microprocessor.

5. The storage apparatus according to claim 4, wherein the management unit uses, as information on the state of the migration-destination microprocessor, information on the response time of I/O processing of the migration-destination microprocessor.

6. The storage apparatus according to claim 4, wherein the management unit uses, as information on the state of the migration-destination microprocessor, information on the configuration of the ownership to the remote-copy group of the migration-destination microprocessor.

7. The storage apparatus according to claim 1, wherein the management unit configures ownership migration information, which includes information on the storage areas which are targets for migrating the ownership and information on the microprocessors which are migration-destination targets for the ownership, in a migration object table.

8. The storage apparatus according to claim 7, wherein the management unit selects the storage areas which are migration-source targets for the ownership on the basis of the ownership migration information in the migration object table.

9. The storage apparatus according to claim 7, wherein the management unit selects the microprocessors which are migration-destination targets for the ownership on the basis of the ownership migration information in the migration object table.

10. The storage apparatus according to claim 1, wherein the management unit selects any of an automatic migration mode, a migration candidate presentation mode or a load variation notification mode in response to a user operation, and determines whether to migrate the ownership according to the selected mode.

11. The storage apparatus according to claim 1, wherein the management unit divides the plurality of microprocessors into a predetermined number of groups and manages the groups, and migrates the ownership in the group units.

12. A method of managing a storage apparatus which is connected via a network to a host apparatus which requests data I/Os,
the storage apparatus comprising:
a plurality of microprocessors;
a plurality of storage areas formed in a drive group configured from a plurality of physical drives; and
a management unit which manages, as the microprocessors which possess ownership to the storage areas, the microprocessors which handle data I/Os to/from one or more storage areas among the plurality of storage areas,
the management method comprising:
a first step in which the management unit detects variations in the processing loads of the plurality of microprocessors;
a second step in which the management unit selects a migration-source microprocessor which migrates the ownership and a migration-destination microprocessor serving as an ownership migration destination, on the basis of variations in the processing load;
a third step in which the migration-source microprocessor determines whether to migrate the ownership on the basis of information on a usage status of resources of each of the storage areas to which the migration-source microprocessor possesses ownership; and
each microprocessor manages a cache dirty ratio, and the microprocessor with the largest cache dirty ratio is configured as a non-migration destination target microprocessor.

* * * * *